(12) United States Patent
Hoyle

(10) Patent No.: US 8,549,410 B2
(45) Date of Patent: Oct. 1, 2013

(54) METHOD OF REACTIVE TARGETED ADVERTISING

(75) Inventor: Martin David Hoyle, Eads, TN (US)

(73) Assignee: B.E. Technology, LLC, Cordova, TN (US)

( * ) Notice: Subject to any disclaimer, the term of this patent is extended or adjusted under 35 U.S.C. 154(b) by 0 days.

(21) Appl. No.: 13/620,256

(22) Filed: Sep. 14, 2012

(65) Prior Publication Data

US 2013/0013410 A1    Jan. 10, 2013

Related U.S. Application Data

(63) Continuation of application No. 12/692,290, filed on Jan. 22, 2010, which is a continuation of application No. 12/110,818, filed on Apr. 28, 2008, now Pat. No. 7,685,537, which is a continuation of application No. 10/909,613, filed on Aug. 2, 2004, now Pat. No. 7,366,996, which is a continuation of application No. 09/744,033, filed as application No. PCT/US99/16135 on Jul. 16, 1999, now Pat. No. 6,771,290, which is a continuation-in-part of application No. 09/118,351, filed on Jul. 17, 1998, now Pat. No. 6,141,010.

(51) Int. Cl.
*G06F 15/00*    (2006.01)
*G06F 13/00*    (2006.01)

(52) U.S. Cl.
USPC ............................................ 715/745; 715/854

(58) Field of Classification Search
USPC ................. 715/700–715, 763–765, 740–749, 715/853–854, 893; 709/209, 210
See application file for complete search history.

(56) References Cited

U.S. PATENT DOCUMENTS 5,347,632 A * 9/1994 Filepp et al. .................. 709/202
5,948,061 A * 9/1999 Merriman et al. ............ 709/219
6,144,944 A * 11/2000 Kurtzman et al. ......... 705/14.54

* cited by examiner

*Primary Examiner* — Kevin Nguyen
(74) *Attorney, Agent, or Firm* — Novak Druce Connolly Bove + Quigg LLP

(57) ABSTRACT

In one inventive aspect, a method of reactive targeted advertising provides for display of advertising, via the internet, to computers of users. In a particular example, a plurality of keywords are stored in a memory. The method comprises determining whether one or more of those keywords are used in a web page, and for any keywords determined to be used, an advertisement is selected using those keywords. The advertisement is for display on the computer of the user who is accessing the web page. A request is received for the selected advertisement, and the advertisement is provided, from an advertising server and over the internet, for display on the computer of the user.

19 Claims, 16 Drawing Sheets

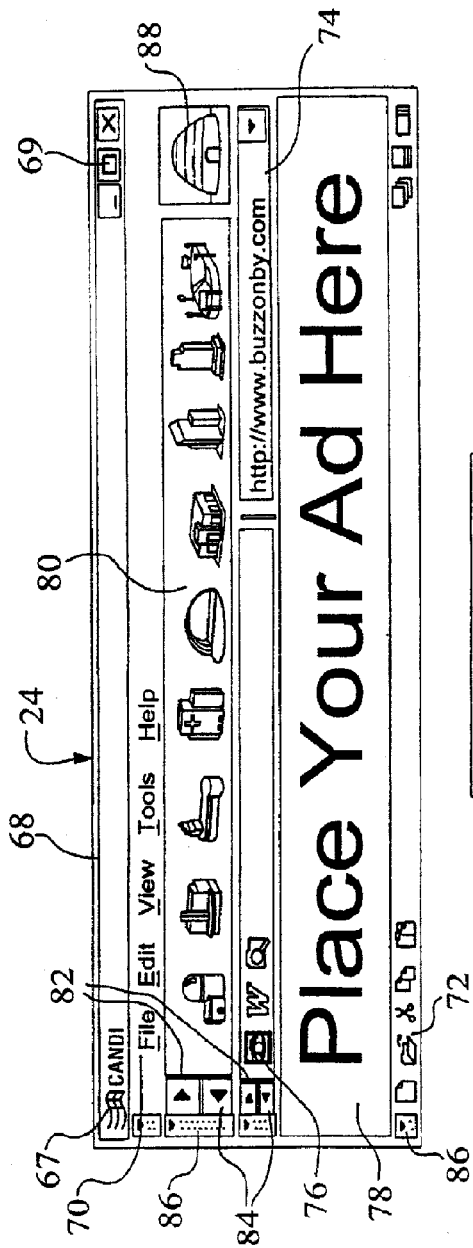
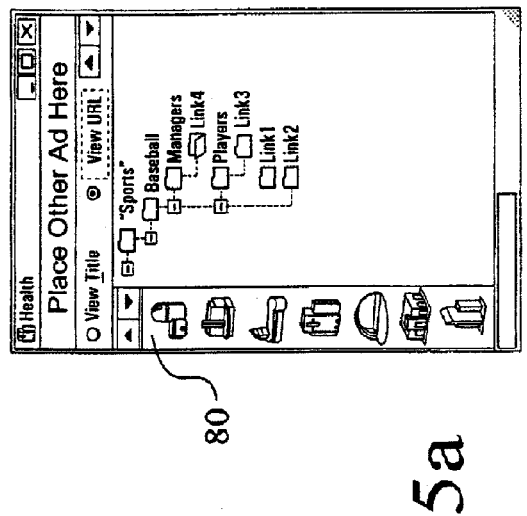
FIG. 5
FIG. 5a

| Image File | Destination Link | Associated Categories | Associated Links | Associated Programs | Priority Level |
|---|---|---|---|---|---|
| Banner01.gif | www.first_link.com | business, finance | www.microsoft.com\excel www.lotus.com\123 | Excel™, 123™ | General |
| Banner02.gif | www.second_link.com\products | business, shopping, computers | | Control Panel:System | High |
| Banner03.gif | third_link.com | sports | www.nfl.com www.espn.com www.sports.com | | Medium |
| .. | .. | .. | .. | .. | .. |
| BannerXX.gif | www.last_link.com\cgi\login | travel, entertainment | | | High |

FIG. 7

METHOD OF REACTIVE TARGETED ADVERTISING

CROSS REFERENCE TO RELATED APPLICATIONS

This application is a continuation of U.S. patent application Ser. No. 12/692,290, filed on Jan. 22, 2010, which is a continuation of U.S. patent application Ser. No. 12/110,818, filed on Apr. 28, 2008 now U.S. Pat. No. 7,685,537, which is a continuation of U.S. patent application Ser. No. 10/909,613, filed Aug. 2, 2004, now U.S. Pat. No. 7,366,996, which is a continuation of U.S. patent application Ser. No. 9/744,033, filed Apr. 11, 2001, now U.S. Pat. No. 6,771,290, as a 371 of PCT/US99/1 6135, filed Jul. 16, 1999, which is a continuation-in-part of U.S. patent application Ser. No. 9/118,351, filed Jul. 17, 1998, now U.S. Pat. No. 6,141,010; and all applications referenced above are incorporated by reference in their entirety, for all purposes, herein.

BACKGROUND

1. Field

This invention relates in general to user interfaces for accessing computer applications and information resources and, in particular, to user interfaces that provide advertising obtained over a global computer network such as the Internet. This invention also relates to user interfaces for maintaining, organizing and communicating information accessible to a computer network such as the Internet and, in particular, to user interfaces that provide the user with availability to that information in a personalized manner.

2. Related Art

The continuing expansion of the Internet and other private and semi-private networks has led to the now widespread practice of electronic distribution of software to end users, whether as freeware, shareware, or fully paid-up licensed software. Traditionally, freeware programs have generally been small, unsupported single-purpose programs that are of limited use. Since no income was derived from these programs, there was little incentive for the creators of this type of software to undertake major development efforts. More recently, however, a new type of free software has emerged which, while free to end users, does provide income to the creator of the software via advertising incorporated into the software. This is of benefit both to the end user and advertiser, as the end user obtains useful software at no cost and the advertiser gets advertising exposure for its products or services. One well known example of this type of arrangement is in push technology products, such as Pointcast™, which permits a user to receive and display broadcasted information over the Internet. Using this software, new advertising is periodically received along with various requested types of news information (e.g., financial, business, sports) and is stored locally on the user's computer for later retrieval and display by the program.

The new advertising medium provided by the Internet has a number of significant advantages for advertisers. First, the users of the software within which the advertising is placed have, on average, much more disposable income to spend on products and services than the average user of other traditional advertising media, such as television or print. Second, the advertising can, in some instances, be targeted in various ways, such as demographically or reactively. An example of the latter of these is in push technology where the user requests certain types of information and this request is used to select the type of advertisement sent to the user along with the requested content. Third, the advertising can not only include audio and video elements as well as simple visual elements, but can also be interactive. For example, by clicking on the advertisement, the user can be provided with additional information about the advertised products or services and can even be given the opportunity to purchase the products or services electronically.

One of the most common methods of advertising via the Internet is through the use of links (e.g., uniform resource locators, known as URLs) embedded within web pages. By using embedded links, the advertisements need not be located on the same server as the web pages themselves. When the web page is loaded or reloaded, the advertising server is accessed to obtain a new advertisement which is incorporated into the web page displayed on the user's screen. These advertisements are simple graphical images (such as animated gifs) that are retrieved from the advertising server along with an associated link to additional information about the advertised product or service. While this permits new advertising to be displayed each time a web page is loaded or refreshed, and while this allows geographically unlimited advertising, it at most permits targeting of the advertisement based upon the type of information contained in the web page. Moreover, access to a new advertisement is only available during the period of time that the client computer is connected to the Internet.

Currently-available computer programs that incorporate advertising into their user interface include the necessary programming built into the software itself. That is, the various parameters relating to the presentation of the advertisement is pre-determined and programmed into the software. These parameters may include such things as where on the screen the advertisement is displayed, the display size, the duration of display, the number of times a particular advertisement is displayed, the conditions under which a particular advertisement is to be displayed, the type of action taken upon a user clicking on the advertisement, and so forth. One problem with these currently available programs is that these parameters can only be changed by replacement of the entire program with an updated, revised version, making it difficult to respond to desired changes in advertising approaches.

To provide demographically-targeted advertising, the advertiser or distributor of the advertising must obtain demographic data on its end users. Perhaps the most common way to acquire demographic data regarding users via the Internet is to request the information using a form written in html (HyperText Markup Language) and provided to the user over the World-Wide Web (WWW) using http (HyperText Transfer Protocol). This is sometimes done as a prerequisite to allowing the user access to information resources or download software from a particular web site. While authentication of demographic information obtained this way is difficult and rarely done, it has been found that end users typically provide accurate demographic data in return for free download access to software. Furthermore, studies have shown that while people are concerned about privacy issues and, in particular, do not wish to provide specific information that identifies them (such as their name, address, or Social Security number), they generally do not mind providing demographic information, nor do they mind monitoring of their computer usage as long as their usage is not associated with any specific information that could be used to identify them.

Various other arrangements have been suggested for obtaining and reporting information about an end user over a computer network such as the Internet. For example, U.S. Pat. No. 5,724,521 to Dedrick discloses an electronic advertising system in which a user profile is created and transferred to a metering server where it is used along with other end user profiles to charge advertiser's according to a consumer scale. The profile data is also used by the metering server to select advertisement titles that are sent to the end user for viewing at the request of the end user. When a user requests an advertisement, the metering server sends the advertisement to the end user, charges the advertiser, and provides the advertiser with profile data on that end user. The system can include client-side software which acquires and compiles information concerning the user's interaction with the advertising or other content provided by the metering server. U.S. Pat. No. 5,732,218 to Bland et al. discloses a system for gathering data concerning an end-user's access to information resources and reporting the data back to the servers that contain the information resources. Data gathering at the client is accomplished using an applet, plug-in, or other browser extension that acquires the data and then reports that data to those servers accessed by the client, either periodically or in response to a specific request by the servers. In this way, the servers being accessed for their information resources get reported back to them information concerning the end-user's use of that information. Limited demographic information (e.g., time zone, locale, client hardware) can be included in this reporting as well.

One of the disadvantages of prior art systems that acquire data regarding an end-user's computer usage is that they are generally limited to gathering information concerning only certain limited uses of the computer. For example, in Bland et al., the focus of the gathering and use of end-user data is in the user's interaction with web pages, whether over the Internet or otherwise. Similarly, in Dedrick, the compilation of data is directed to interaction between the end-user and the advertising or other content provided by the metering server itself. By limiting the reported data in this manner, it is difficult to develop accurate profiles for the individual users that are useful in targeting the advertising.

U.S. Pat. No. 5,347,632 to Filepp et al. discloses a reception system in which both user demographics and individual system usage information can be used to target advertising. However, this information is used to select which advertisements are to be placed into an advertisement queue from which advertisements are then accessed, apparently in the order in which they were placed in the queue. Thus, this system permits targeting of advertising generally, but does not provide real time targeting of advertising based upon user actions.

Internet users typically employ browser applications and related technologies in order to access the WWW; and to locate and view files, documents and audio/video clips. Exemplary browser applications include Opera by Opera Software, Netscape Navigator, Netscape Communicator 4.6 and Microsoft Internet Explorer 5.0. Browser applications are loaded onto a user's computer, and then can be used for communication over networks using protocols such as that utilized by the WWW. Browsers are useful for accessing desired files and web sites, and also have the capability of storing information regarding visited or favorite web sites on the user's computer. However, it has been common practice for browsers to be employed by the user for fairly limited purposes, such as for accessing information. Certain applications, such as Windows NT 4.0, allow a user to receive and store electronic information on a limited network system. However, the usefulness and flexibility of such systems are severely limited, because each browser installation traditionally has been independent of other browser installations to which a user has access. Thus, information within one browser is not easily transportable to the other browser.

Except as may be explicitly indicated otherwise, the following definitions shall apply:

browser—A program that can communicate over a network using http or another protocol and that can display html information and other digital information.

client computer—A computer that is connected to a network (including computers that are connected only occasionally to the network such as, for example, by a modem and telephone line) and that can be used to send requests for information to other computers over the network.

computer—An apparatus having a processing device that is capable of executing instructions, including devices such as personal computers, laptop computers, and personal digital assistants, as well as set top television boxes, televisions, radios, portable telephones, and other such devices having a processing capability.

computer usage information—Data concerning a person's use of a computer, including such things as what programs they run, what information resources they access, what time of day or days of the week they use the computer, and so forth.

data set—A group of data items; for example, links, keywords, or entries in an address book.

display object—Data capable of display by a computer, including graphical images as well as multimedia presentations or other display data that includes audio in addition to visually-perceived data.

file—Any digital item, including information, documents, applications, audio/video components, and the like, that is stored in memory and is accessible via a file allocation table or other pointing or indexing structure.

graphical image—Visually-perceived data stored in a graphic format (e.g., jpeg, gif bmp, tiff, pcx, etc.), including electronically-reproduced photographs, graphics, animations, icons, and textual messages.

information resource—A source of information stored on a server or other computer that is accessible to other computers over a network.

keyword—A textual data item used in locating related sources of information.

link—A data item that identifies the location or address of a program or information resource. A URL is a link, as is a path and filename of an information resource.

network—A system having at least two computers in communicable connection, including intranets, personal networks, virtual private networks, and global public networks such as the Internet.

non-volatile data storage device—A memory device that retains computer-readable data or programming code in the absence of externally-supplied power, including such things as a hard disk or a floppy disk, a compact disk read-only memory (CDROM), digital versatile disk (DVD), magneto-optical disk, and so forth.

profile—User-specific information relating to an individual using a computer.

program component—A set of instructions stored in a file in computer-readable format, whether as object code or source code, and whether written in a compiled language, in byte code (such as Java™), or in a scripting or other interpreted language.

program module—One or more related program components.

program—One or more related program modules.

reactively—In response to some type of user input, such as a mouse click on a particular user application or on a link to an information resource.

server—A computer on a network that stores information and that answers requests for information.

software application—A program and associated libraries and other files; for example, a word processing application, a spreadsheet application, or a personal information management application.

SUMMARY

In accordance with one aspect of the present invention there is provided a method for reactive targeted advertising via the internet for display on a user's computer accessing a web page. The method comprises storing a plurality of keywords in a memory and determining that one or more of said keywords is used in a web page. The method continues with selecting an advertisement using the one or more keywords, where the advertisement is for display on a user's computer that is accessing the web page from a web server. The method also comprises receiving a request for said advertisement from a user's computer accessing the web page from the web server via the internet, and providing the selected advertisement for display on the user's computer from an advertising server via the internet.

BRIEF DESCRIPTION OF THE DRAWINGS

A preferred exemplary embodiment of the present invention will hereinafter be described in conjunction with the appended drawings, wherein like designations denote like elements, and:

FIG. 5 is an exemplary view of the graphical user interface (GUI) generated by the client software application of FIG. 4;

FIGS. 5a-5c are exemplary views of a bookmark category window generated by the client software application of FIG. 4;

FIG. 7 depicts the structure of the banner database used by the client software application of FIG. 4;

DETAILED DESCRIPTION OF THE PREFERRED EMBODIMENTS

Figure 1:
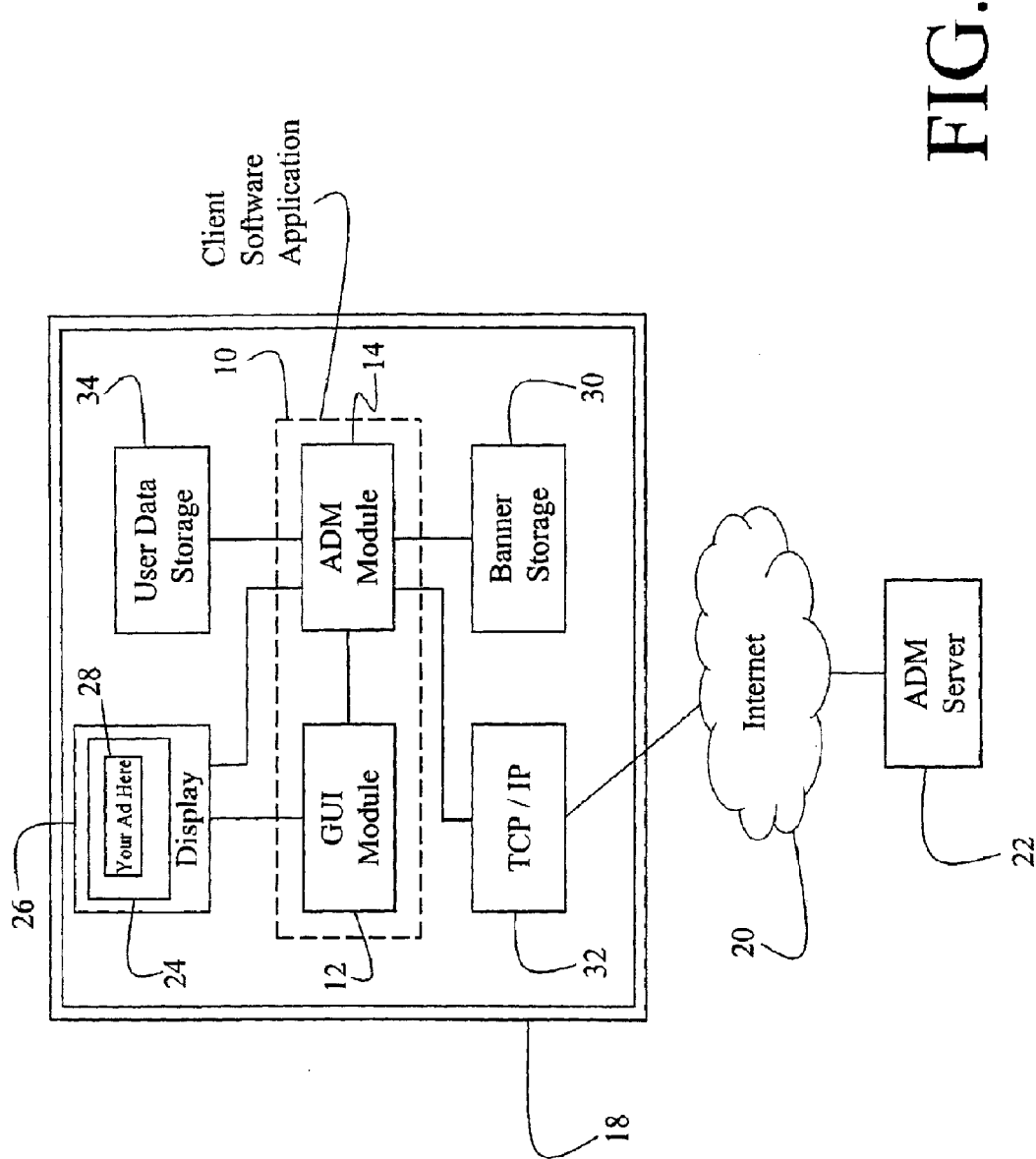
FIG. 1 is block diagram of a first embodiment of the invention depicting a client software application comprising two program modules located on a computer connected to a server by way of the Internet.

Referring first to FIG. 1, there is shown an overview of a client software application 10 comprising a graphical user interface (GUI) program module 12 and an advertising and data management (ADM) program module 14. Working together, these program modules act as a single software application that provides the computer user with a fully integrated interface to the other software applications loaded on the user's computer 18, as well as to information resources located on a private or public network, such as the Internet 20. Client application 10 may also include other executables, support files, and libraries that are used by program modules 12 and 14. In general, GUI module 12 contains the basic programming necessary to provide a user interface to the computer's software applications and operating system (e.g., Windows98 or WindowsNT), while ADM module 14 provides the basic management of the display and refreshing of advertising as well as the acquisition and reporting of computer usage information to an advertising and data management (ADM) server 22 via the Internet 20. As will be discussed below, client software application 10 provides an organized interface into the files and other applications on the user's computer. That is, the client software application 10 supports an intuitive GUI that can provide access to network bookmarks (i.e., stored URLs), and can initiate execution of local application software packages. In addition, features are provided to deliver advertising (e.g., banner advertising) to users based on demographic and computer usage information or data captured from users (e.g., data supplied by users during registration, and demographic and usage demographic data captured from information obtained based on web site visitation, applications employed, and other usage data); and that targeted advertising can be displayed to those users during the course of use of the computer by those individual users, irrespective of whether those users are connected to a network (i.e., are online) or whether those users are using the computer for a non-network application (i.e., are offline).

Preferably, the client software application 10 is presented in such a manner that the user need not have any special skill or training in order to operate that application. That is, the application and the services provided by the advertising modules associated therewith can be used by persons having no computer skills and may have received limited training in the operation of software, such as that involved in the present invention.

Computer 18 is a conventional personal computer, such as one that utilizes an Intel™ Pentium™ microprocessor. As is common, computer 18 includes RAM, a hard disk drive, a floppy drive, a CD-ROM or DVD drive, a mouse or other serial input device, a keyboard (all not shown), as well as a monitor 26. Computer 18 also includes a network adapter card through which it accesses the Internet. Alternatively, it can include a modem for accessing the Internet via a standard telephone line, cable, or wireless communication path. As will be discussed below, client software application 10 is initially stored on a computer-readable memory (such as a hard drive) at server 22 and a copy is then downloaded and stored on the hard drive of computer 18 in response to a download request by the user.

As will be discussed in greater detail below in connection with FIGS. 5 and 6, GUI module 12 generates an application window 24 that is displayed on the computer monitor 26. This window is separated into a number of regions, one of which is a banner region 28 for advertisements or other messages processed by ADM module 14. The advertisements displayed in banner region 28 are display objects such as graphical images that are stored on the computer's hard drive or in other non-volatile memory as a file or multiple files which are collectively represented in FIG. 1 as banner storage 30. They are accessed as needed by ADM module 14 and displayed in banner region 28. Upon ADM module 14 determining that new advertising is needed, it accesses the Internet via an existing TCP/IP connection 32 and downloads new banners from ADM server 22. Periodically, computer usage information is sent to ADM server 22 for use in profiling the end user and better targeting future advertising to the end user. This computer usage information is stored on the end user's computer 18 in user data storage 34, which again can be the computer's hard drive or other non-volatile storage.

By separating out the advertising and end-user data management functions and providing them as a separate program, these functions can be changed easily by replacing the ADM module 14 without the necessity of downloading and installing an entire new version of the software. This update capability can be programmed into GUI module 12 (or, possibly, into ADM module 14) so that it periodically checks with server 22 for an updated ADM module 14 and, if found, downloads the new program and installs it as necessary. This can be done automatically without the client software application requiring any user input, if desired. In addition, either program can be disabled (e.g., as determined and controlled by the supplier of the programs) in order that a particular user receives operation of only the management function program or the advertising function program.

ADM module 14 can be downloaded as object code, in which case it can be executed as is and can be started by the GUI program 12 each time that program is run. Optionally, ADM module 14 can be written in byte code, such as Java™, or even in a suitable scripting or interpreted language. If desired, the execution engine needed for these latter types of programming can be provided originally as a part of the total software application 10. Alternatively, existing execution engines, such as those found in Java™ and JavaScript™-enabled browsers, can be used to execute ADM module 14 upon call by GUI module 12. Moreover, if written in one of these latter programming languages, GUI module 12 or ADM module 14 can initiate operation of the browser (if not already running) and can direct the browser to ADM server 22 in which case the new version of ADM module 14 can be automatically downloaded and run by the browser.

Figure 2:
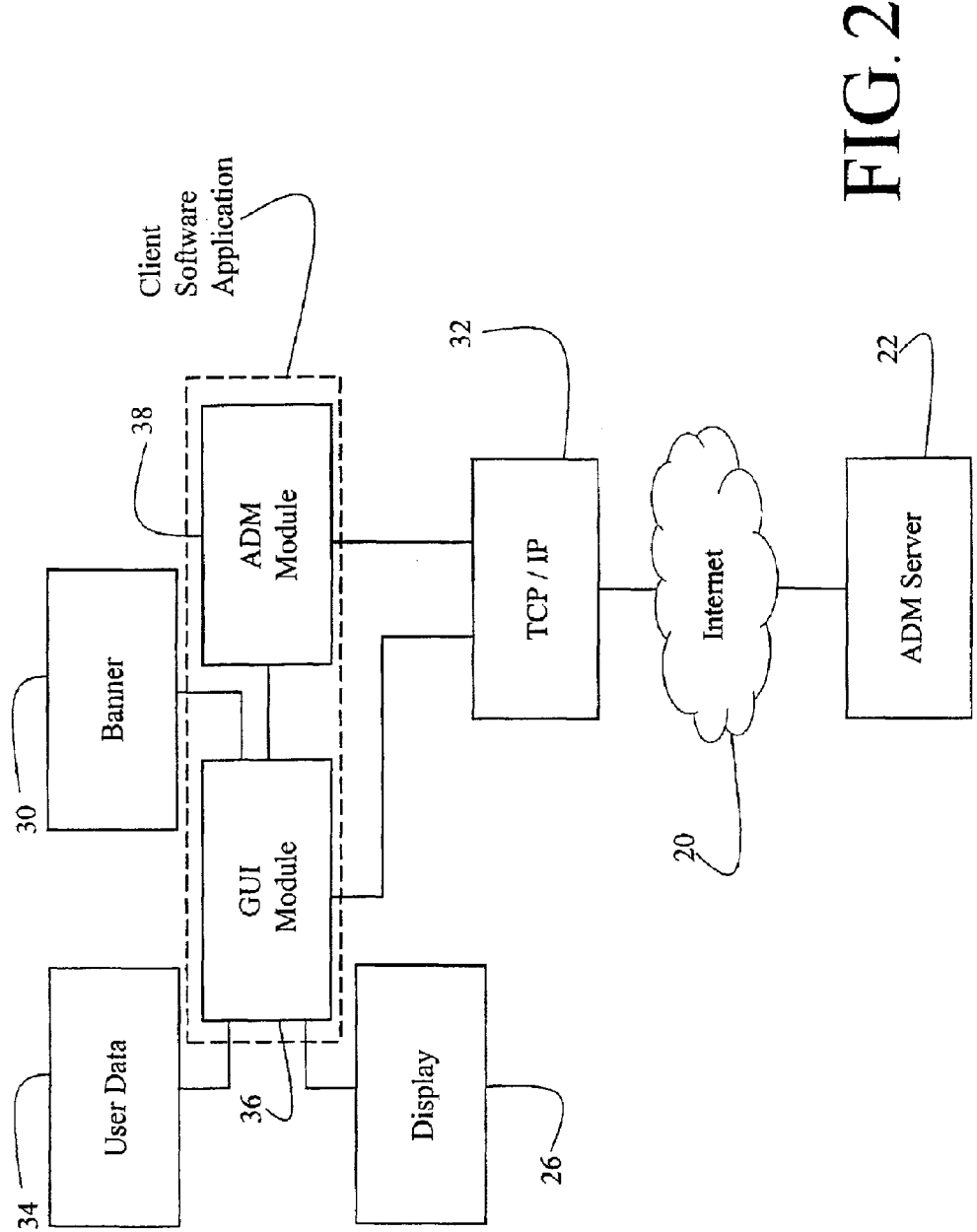
FIG. 2 is a block diagram of second embodiment that is a modified form of that shown in FIG. 1.

Although ADM module 14 is shown in FIG. 1 as handling storage of the computer usage information and banner advertising, as well as display of the advertising and reporting of the computer usage information, it will be appreciated that most of these functions can be handled by GUI module 12, with ADM module 14 simply providing the basic logic and rules which govern the display and reporting functions. This is shown in FIG. 2. In this embodiment, GUI module 36 still reports events to ADM module 38 which, as in the system of FIG. 1, determines what action is to be taken. However, it is GUI module 36 that actually does the work, including accessing or storing data in banner storage 30 or user data storage 34, reporting computer usage information to ADM server 22, accessing new banner advertising from server 22 and, when available, downloading a new ADM module 38. One advantage of this separation of functions between GUI module 36 and ADM module 38 is that it permits ADM module 38 to be written as a streamlined program module that occupies a minimum amount of storage space so that the basic logic governing advertising processing can be easily and quickly upgraded by downloading a new ADM module 38.

Figure 3:
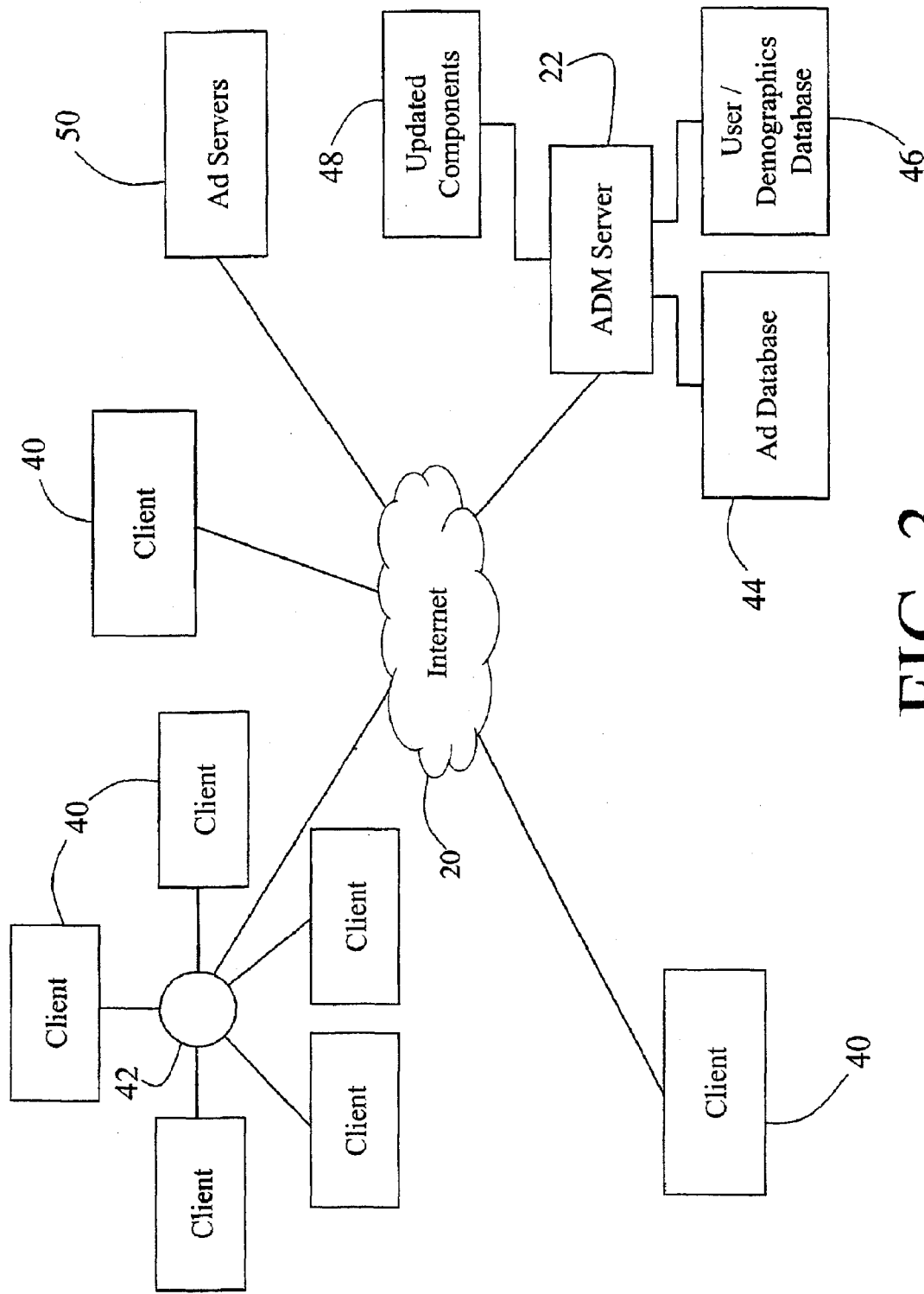
FIG. 3 is a block diagram depicting further details regarding use of the server shown in FIG. 1.

Referring now to FIG. 3, ADM server 22 is accessible via the Internet by any of a number of remotely located client computers 40 on which client software application 10 is installed. This can include client computers that are connected directly to the Internet, as well as computers connected via private or other types of networks, such as a LAN 42. ADM server 22 has associated with it an Advertisement Database 44 and a User/Demographics Database 46. Ad Database 44 stores the banner advertising that is provided to the client computers 40 both initially when client application 10 is installed and thereafter periodically as the advertising needs to be replaced. As will be discussed in greater detail below, each advertisement is assigned to one of three priority levels (general, medium, or high) that are used in reactively targeting the banner advertisements. These assignments of the advertisements are stored along with the advertisements themselves in Ad Database 44. Periodically, new advertising can be added to Ad Database 44. Preferably, this is accomplished via the Internet with the new advertising being obtained from one or more Advertising Servers 50, which may be run by an advertising distribution organization or may simply be computers operated by the individual advertisers themselves.

User Database 46 stores the demographic information used in targeting the advertising downloaded to the individual client computers 40. As will be described below, when a user first accesses client application 10 for the purposes of downloading and installing the software, demographic data is obtained on the user and that information is then used to determine what advertising will be provided to that user. In addition, User Database 46 can capture other demographic information, including information regarding web sites visits (e.g., time, date, duration of visitation), including information visits to web sites related to banner advertisements; and can capture information regarding various types of network material, such as static sites (e.g., html, http), secure sites (e.g., https) and dynamic sites (e.g., ActiveX or Java). Whenever new advertising is required for a particular user, the relevant information from User Database 46 will be used to determine which advertisements should be downloaded to that user's computer. Thus, targeted advertising is provided to the user. That is, advertising material can be provided to the user can be targeted based on demographic and other data captured during registration and subsequent use of the client software application 10. Advertising can be based on user activities, such as is determined by supplied user information, determination of applications used, recognition of files opened and observation of URLs visited.

In addition to advertising selection and distribution, ADM server 22 also handles the distribution of upgrades to client software application 10. In general, the upgrading process involves communication between ADM server 22 and the client computers 40 to determine what program modules are installed at the client computer and to compare those modules to the latest set 48 maintained at ADM server 22. As will be described in connection with FIGS. 4 and 13, this is preferably accomplished using a "blueprint" that contains an identifier (e.g., filename and version number) of each of the program modules used by client software application 10. Once it is determined that one or more program modules need to be updated, they are accessed at ADM server 22 and downloaded to the requesting client computer 40 and installed.

Typically, a user has one or two client computers 40 that they primarily use to run applications and access the Internet; for example, an office and/or home computer. However, it is sometimes necessary or desirable for the user to utilize other client computers 40, whether due to traveling, a breakdown of their primary computer, or some other reason. Regardless of which client computer 40 is used, ADM server 22 provides a user with access to his or her preferences and customized settings for the various software applications utilized by the user, as well as his or her other personal data, including email addresses and bookmarks or other links to local and Internet files and information resources. This is accomplished using a user profile that is stored in the user database 46. The user profile is accessed by client software application 10 using a unique identifier for the user which, as will be described below, can be obtained via a login onto software application 10 or via a network or operating system login on the client computer 40. The user profile can contain user-specific customized settings for the operating system used by client computer 40, including the desktop icons and shortcuts utilized by that particular user. It can also contain other operating system customization information including, for example, color schemes, font settings, backgrounds, screen savers, and wall paper settings. For particular software applications such as word processing programs, browsers, or spreadsheet programs, the user profile can contain user preferences for the interfaces provided by those applications, as well as templates, macros, and other such user-specific resources. The user profile additionally contains bookmarks, shortcuts, and other such links to files and information resources accessible via either network 42 or the Internet 20. Furthermore, the User Database 46 of ADM server 22 can include a user library that enables the user to store files (documents, executable programs, email messages, audio clips, video clips, or other files) that can then be accessed from any client computer 40. As will be appreciated, by storing the user profile and user library on server 22, the user can have world-wide access to their preferences, addresses, bookmarks, email, and files without having to physically transport them from one place to another.

Once a user profile or files from a user library have been downloaded to a particular client computer 40, they are utilized by the user and, in some cases, changed, whether it be by modification of a template, an addition of a bookmark, a change to a user interface preference, or some other such modification. These changes are reported back to server 22 by software application 10, either as they occur, or at the end of the user's session. This allows the user profile and user files located on the client computer 40 to be synchronized with that stored in user database 46. Also, the user profile and downloaded user files located on client computer 40 can be erased or ejected from that client computer 40, either upon command of the user or automatically at the end of a user session.

Figure 4:
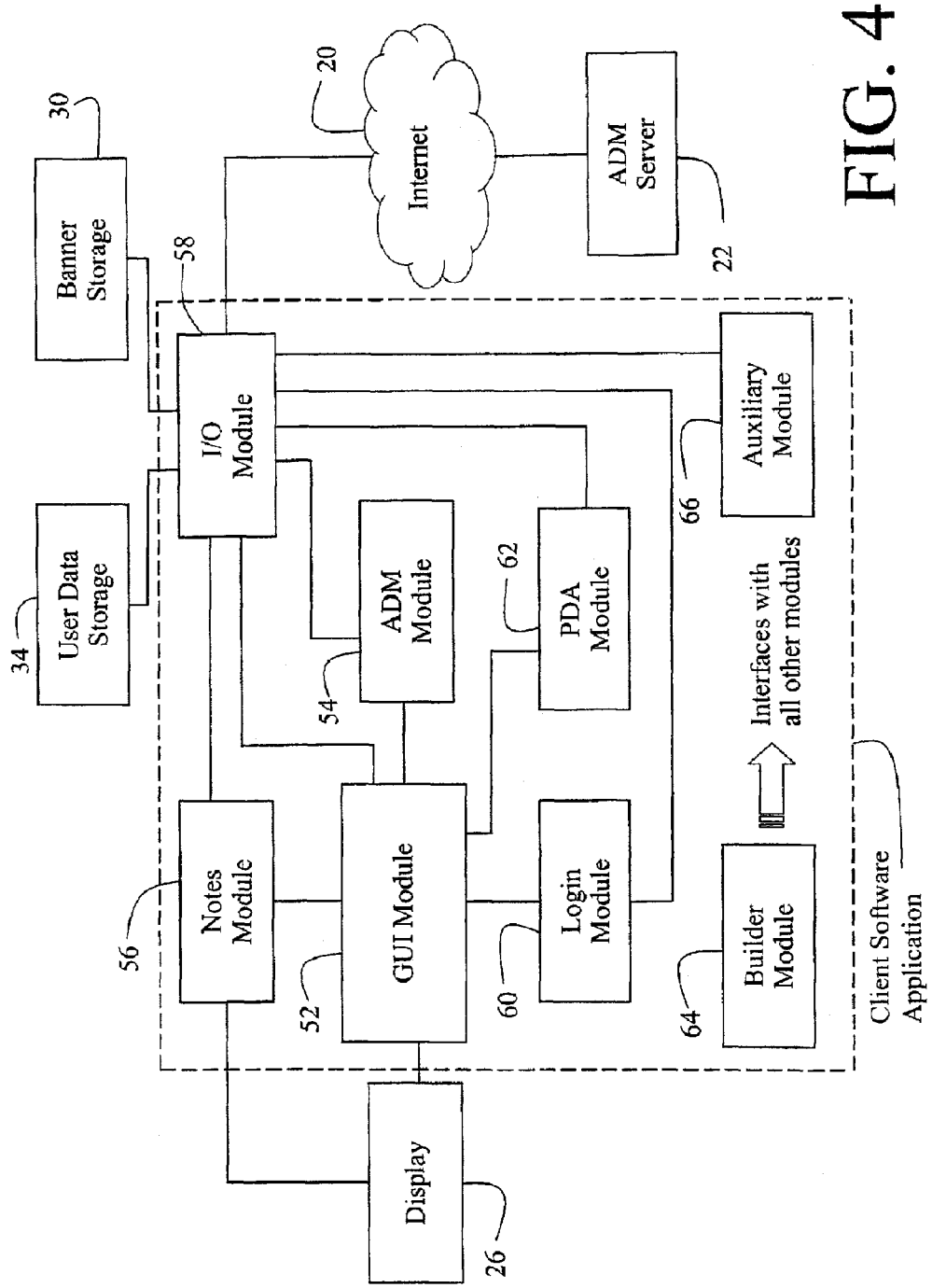
FIG. 4 is a block diagram of a third embodiment of the invention depicting a client software application broken into a number of modules including a builder module responsible for upgrading and addition of any of the program modules.

Turning now to FIG. 4, there is shown a third embodiment of the client software application. In this embodiment, the software application can have the same functionality of the first two embodiments, but is separated into a number of program modules that interact to provide this functionality. In particular, it includes a GUI module 52 and ADM module 54 as in the first two embodiments, but further includes a notes module 56, I/O module 58, login module 60, PDA module 62, builder module 64, and auxiliary module 66. Some of these additional modules, such as the notes module 56, provide added functionality not included in the modules of the FIGS. 1 and 2 embodiments. Other of these modules, such as I/O module 58, perform functions that were incorporated into the GUI and/or ADM modules of FIGS. 1 and 2.

Before describing the various modules in detail, reference is made to FIG. 5, which depicts a Windows™ version of the user interface provided by GUI module 52. The user interface comprises application window 24 separated into a number of regions. The entire row of icons can be rotated to different categories of groups of icons (i.e., individual rows can be designed for categories such as business, sports, hobbies, projects, etc.). These regions include a title bar 68, pull-down menu 70 (which identifies functions such a edit, view, tools, users, etc.), a set (toolbar) of menu icons 72, a URL text field 74, a toolbar containing application icons 76, a banner advertising region 78, and a toolbar containing bookmark category icons 80. While some of these regions provide unique commands and functions that will be described below, the programming used to generate the display in these regions and to enable interactivity with the items displayed within these regions is well within the level of skill in the art.

Title bar 68 can display items such as the name of the software product or service, as well as the name of the current user of the application module or other salutary information. It includes an application button 67 which opens a menu when selected. A close, maximize and minimize button set 69 is also provided to allow the size of the application displayed interface to be changed; for example, to temporarily close or be minimized, or to temporarily suspend the display of banner advertisements.

Pull-down menu 70 contains the basic commands available to the user, including launching applications, accessing basic editing commands, changing the display of the user interface, adding and removing application and bookmark category icons, changing window views, and obtaining help. Other basic commands that can be available for view and use (but are not shown) include access to a menu that identifies guest users registered on a particular account, a search button that invokes a web browser to which the user has access to connect to a web site or a search engine, and a menu item that allows initiation of procedures for user registration. This menu item can be labeled, for example, as a "User" menu item; and can be used to allow an initial user to identify, add or delete guest users, as well as to also allow the user to relinquish control of the application (i.e., cancel the service). The use of the "User" menu items also allows for efficient and effective change in the identity of the currently active use when more than one user is using the same computer. Clicking upon a button labeled as a "Search" menu item can invoke a network browser previously installed within the computer and hence can connect with a web site of a search engine. A menu item labeled "Edit" can act on icons to be clicked on by the user; and such items can include well known commands including undo, redo, add, copy, cut, paste, delete and properties; or those commands can be selected as depicted as the toolbar of menu icons 72. A menu item labeled "View" can provide a sub-list containing a listing of so-called shortcuts to applications (i.e., files identified by simple name or icon) and hyperlink channel listings; which listings can be added by the user. A menu item labeled "Tools" can provide a listing of various parameters and capabilities available to a particular user using a particular computer. A menu item labeled "Help" invokes a context-sensitive help facility for the user, provides information about the product, provides information regarding the capabilities of the product, and provides pointer-based direction to the user.

Menu icons 72 contain a number of icons that permit quick access to some of the more common commands contained in menu 70. URL field 74 is a conventional drop-down input box that can be used for entering URLs or path and file names of locally-stored web pages. Once a user has entered a web page location into this field and pressed "Enter," GUI module 52 initiates operation of the user's default browser and directs it to access and display the specified web page. Banner advertising region 78 is an information display region in which is displayed graphical images comprising advertising stored locally on the computer. These advertisements are replaced in response to various events including, in particular, user interaction with the computer. Application icons 76 provide single-click initiation of any programs accessible by the user's computer. When client software application 10 is first installed, it initially builds this toolbar using the shortcuts existing on the computer's Windows™ desktop. Thereafter, the user can customize this toolbar, either by dragging icons onto or off of the toolbar, or via a suitable command available under the "Tools" menu item. The client software application can be programmed to automatically add or remove icons from this list when they are added or removed from the Windows™ desktop. Furthermore, the icons can be automatically organized by the program, either in alphabetical order or otherwise. The bookmark category icons 80 are each associated with a set of links related to a particular category of information, such as finance, news, or sports. By selecting one of the icons, a separate application window containing the related links is opened on the screen. This is shown in FIG. 5a. This window also includes a vertically-oriented toolbar containing bookmark category icons 80 so that the user can switch to other categories of links by clicking on the appropriate icon 80. That is, each bookmark category icon 80 represents a hyperlink channel category that contains related hyperlink bookmarks. Moreover, the links or bookmarks need not be to web sites only, but can be links or shortcuts to documents and other files, whether stored locally on the user's computer or remotely on a server. Thus, the user is provided with the ability to combine selected documents, applications, web sites, audio files and video files all under the same channel category. The user has the ability to subscribe the channel by making a direct link to a file, or by combining various files under some category, or by providing a drop down list to a subscribed channel. In addition, the entire row of icons can be rotated to different categories of groups of icons (i.e., individual rows can be designed for categories of desired topics). For this purpose there can exist two rotate buttons (not shown); one for the row containing bookmark category icons 80 and one for the application row containing application icons 76. A click on either of those buttons causes a dropdown menu to appear for that respective row, with the name thereof identifying other rows available to the user. The user simply clicks on the name within the menu, and the selected shortcut row appears. In addition, the menu can contain the terms "disassociate" and "associate." If the user selects the "associate" option, the user interface can automatically rotate the appropriate channel row to the exposed position when the corresponding URL is accessed.

The content of these channel categories can be developed by the user simply by dragging icons representing URLs or files onto the window of FIG. 5a or onto the icon 80 representing the desired channel category. Additionally, the channel categories themselves, including their icons 80 and associated URLs and files can be provided by others and can be represented on web sites using an icon or hypertext link. For example, a web site can include an icon which, when selected provides the software client application with a pre-loaded channel category in the form of a file containing the bookmark icon 80 and associated URLs. This is then automatically added to the client software application's user interface. This allows entities, such as corporations or other business entities, to develop pre-loaded channel rows that, when placed onto a web page, can be either clicked or dragged and dropped onto the user interface to transfer the channel category.

Figure 5C:
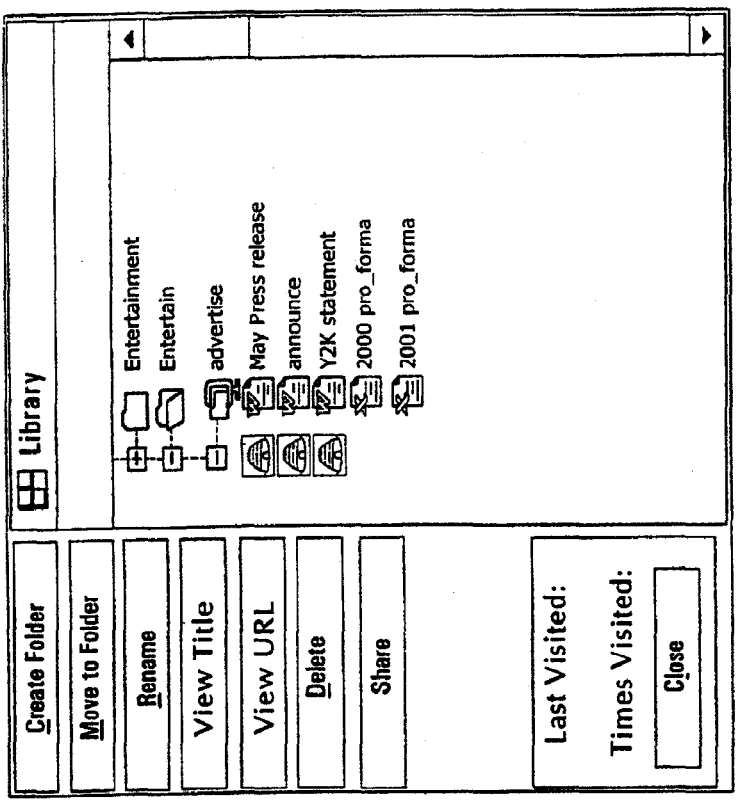
Figure 5B:
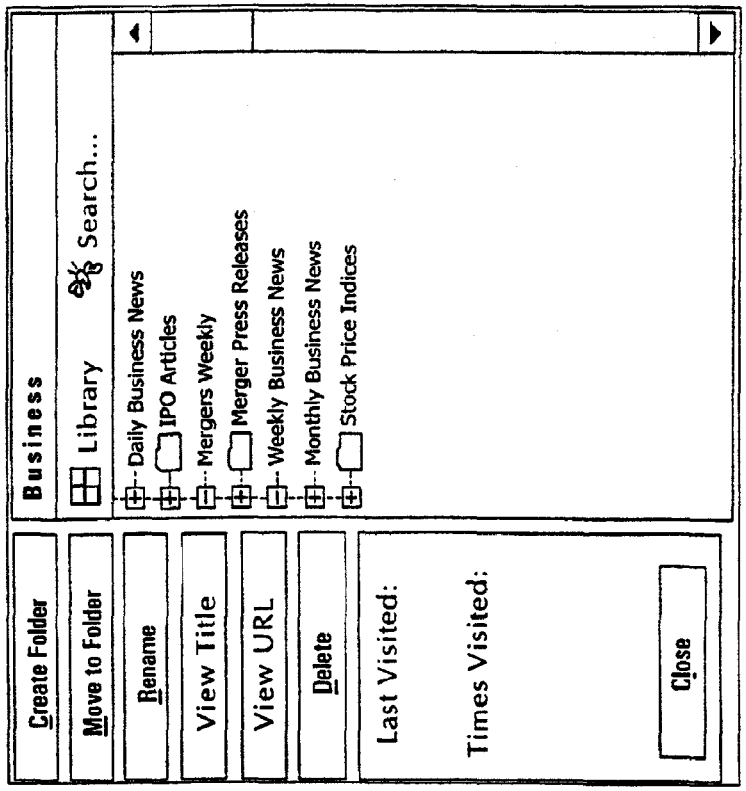

FIG. 5b shows an alternative embodiment of a window as in FIG. 5a, including icons that represent various files and links to information resources. The window shown is for a particular hyperlink channel category, in this case a business category and would therefore contain links relevant to business-related files and resources. As shown, this window includes a library icon which, when selected, provides a display as shown in FIG. 5c which contains a list of all of the files contained in the user library. From here, the user can access any of the files contained in his or her user library and can associate any of those files with the business category, in which case a link to that file will then appear in the business category window of FIG. 5b.

The program is operable to respond to the user's selection of any one of the links by accessing the selected web page using the default browser. As with the application icons 76, bookmark category icons 80 can be added or removed from the toolbar. Furthermore, additional links can be added to the categorized sets of links, whether by conventional drag and drop methods (i.e., dragging onto the bookmark category icons 80) or via menu commands. In addition, further so-called shortcut rows (e.g., hyperlink channel rows or application shortcut rows) listing a variety of icons, and corresponding buttons to expose and minimize those rows, can be provided. Preferably, as shown, one row is provided for organizing and locating web hyperlink bookmarks, and a separate row provides for organization and location of applications. The toolbar also can contain further optional features, such as a lockdown bar (not shown) that can be dragged left or right to positions between icons in a row; or a rotate button (not shown) can be clicked on to cause the set of available rows to be displayed. Also, scroll buttons (not shown) or other means for exposing stored icons, can be employed.

To permit user customization, the toolbars containing application icons 76 and bookmark category icons 80 include a slidebar 82 that is initially positioned at the far left of the toolbar, as illustrated, and that can be moved by the user to a location between any two icons on the toolbar. Thereafter, icons to the left of the slidebar cannot be re-organized except by express action of the user. These toolbars also each include left and right arrow buttons 84 that shift the icons in the associated toolbar to the left and right, respectively. These arrow buttons will not affect any icons located to the left of slidebar 82. Each of the toolbars, including the pull-down menu toolbar, includes a collapse button 86 that serves to toggle the display of its associated toolbar. This permits users to collapse the display size of the graphical user interface and to hide those toolbars that the user does not wish to utilize often.

A final region of window 24 is a conventional linked icon 88, which can be used to direct the user's default browser to the home page of the company that provided client software application 10. Linked icon 88 can allow the user to access the user profile or user library, or can provide a further opportunity to access a particular search engine or link to a particular web site. For example, this icon can be used to bring up a window which includes a list of the files located in the user library. It can also be used to load the user preferences stored in the user profile or to, for example, erase or eject the user profile from the client computer currently being used. Also, window 24 can include another icon (not shown) that, when selected, accesses a local floppy or other non-volatile data storage device to retrieve various types of data. For example, a user may want to utilize client application 10 on different computers; for example, a laptop and home or office desktop computer. To prevent the user from having to separately customize each of the two user interfaces, GUI module 52 is operable to store the user's customization settings and preferences on a floppy disk or other non-volatile storage. This disk can then be inserted into the other computer and, once the client application is executed, clicking on the same icon will cause the program to access the disk and to retrieve and apply the user's customizations and preferences to the user interface.

In addition to the toolbar containing bookmark category icons 80, window 24 can also include a "home" or "local" toolbar (not shown) containing the same icons 80, but with the links associated with each category icon 80 being specific to the user's local and regional interests. Thus, for each category of information, this permits the user to keep links to local web sites separate from their other links. In this way the user can, for example, keep links related to local high school sports separately from links for professional sports. When an icon on this "home" toolbar is selected, a window (not shown) separate from that shown in FIG. 5a can be opened or, alternatively, the FIG. 5a window itself can be used, with a button or other means being provided to allow the user to switch between the icons representing the "home" groups of links and the icons representing the other groups of links. In addition, the window shown in FIG. 5a can have additional menu items allowing the user to perform certain functions or execute commands by click of a mouse. For example, the user can create files, move a folder, rename a file, view a title, view a URL, delete a file, perform a search, update a personal profile, close the application, or perform a variety of other tasks.

Preferably, the client software application of the present invention is automatically started when the computer is placed in operation (e.g., when the user logs on). That software can identify the user who has been identified as having logged on. The application then places itself in a position on the computer's video screen that has been defined by the user (e.g., by drag and click techniques); or the application places itself in a default position (e.g., such as the top right region of the screen, but leaving space to leave exposed function icons, such as the well-known close, maximize/restore and minimize buttons). In a closed position, the system preferably presents itself in a manner that takes up about 3 to about 15 percent, more preferably about 5 to about 10 percent, of the area of the screen; and preferably presents advertising banners. However, the user can place a mouse cursor over the banner advertisement, or use other means to cause the opening of the system, in order to provide the system in an open format of the type shown in FIG. 5. Alternatively, the user can place a mouse cursor over the banner advertisement possessing a network hyperlink or URL associated with it in order to cause the cursor to change into the shape of a hand, and clicking of the mouse button by the user can be used to cause the default browser of the computer to be invoked, following which the resource addressed by the URL is loaded. Thus, the web site of an advertiser can be automatically accessed when the user clicks on the advertiser's banner advertisement. That is, for a computer with network access, clicking of a cursor using a mouse upon an advertisement accesses a remotely located client computer 40, resulting in a link to that web site.

Figure 6:
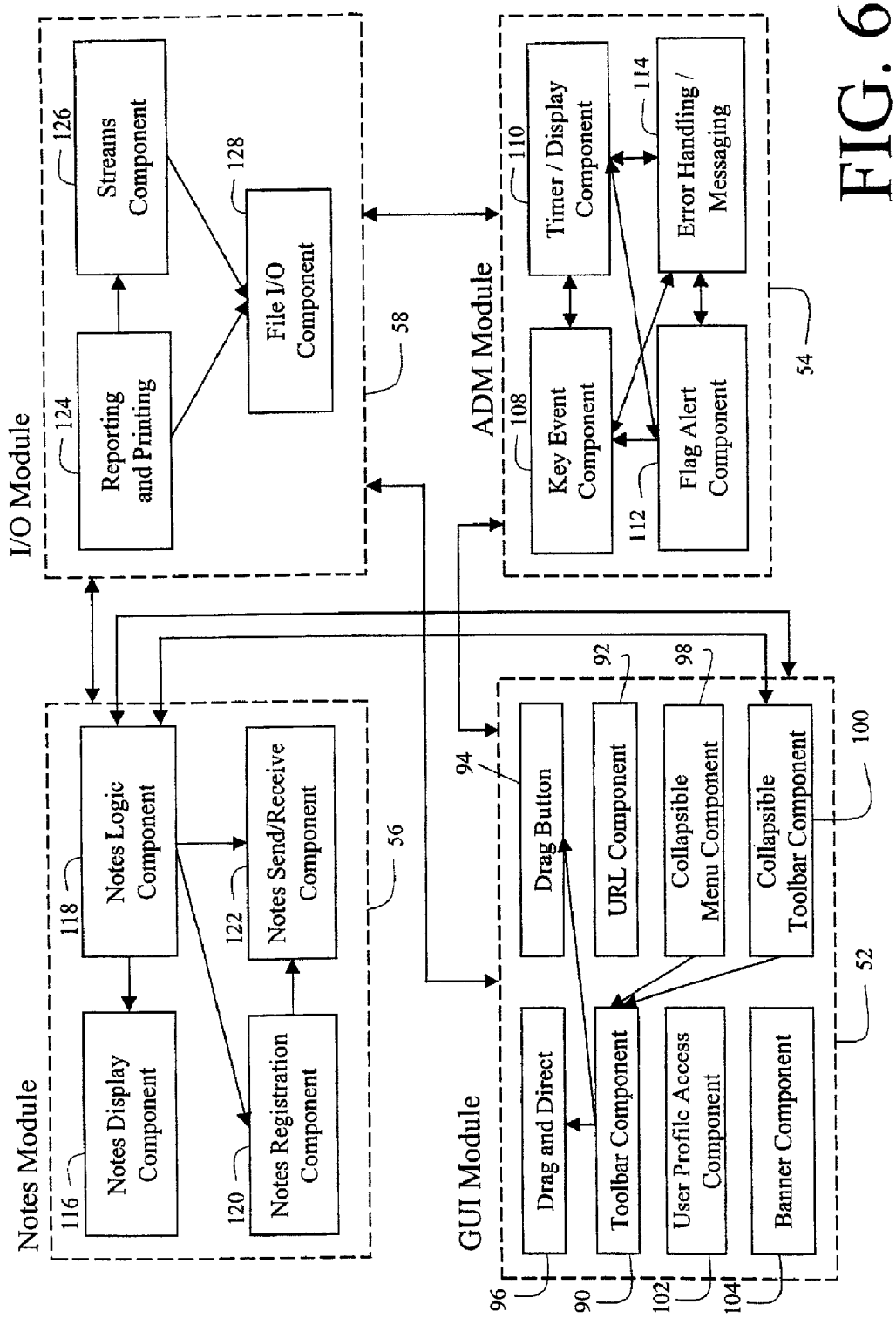
FIG. 6 is block diagram that provides additional detail regarding the client software application depicted in FIG. 4.

Referring now to FIGS. 4-6, the details of the various program components and modules that comprise client software application 10 will now be described. As discussed above, GUI module 52 provides the programming used to display application window 24 including all of its various regions on a computer monitor or display 26. It accesses user customizations and preferences from user data storage 34 via I/O module 58 and interfaces with the other program modules. The user interface provided by GUI module 52 is implemented using a number of program components written in ActiveX™, Java™, or any other suitable programming language. These components include a toolbar component 90, a URL text field component 92, a drag button component 94, a drag and direct component 96, a collapsible menu component 98, a collapsible toolbar component 100, a user profile access component 102, and an advertising banner component 104.

Toolbar component 90 contains the programming code used to display and manage the applications icons toolbar 76 and the bookmarks categories toolbar 80. This includes the programming that generates the slidebars 82 and left/right buttons 84. This component interfaces with drag button component 94 which contains the programming that generates the various toolbar buttons that are represented by the different icons 76 and 80. Toolbar component 90 also interfaces with drag and direct component 96 which allows the user to customize the toolbars by shifting the icon buttons left or right on the toolbars, as well as drag and drop capabilities to add buttons to or remove buttons from the toolbars. URL field component 92 provides the URL text field 74 that permits direct user input of URL's. Collapsible menu component 98 contains the programming that generates and provides functionality to the pull-down menu 70. Similarly, collapsible toolbar component 100 is used to generate the toolbar containing the menu icons 72. Components 98 and 100 can be derived from the main toolbar component 90 and can function like any other toolbar, except that they are collapsible. User profile access component 102 contains the programming used to access the computer's floppy disk drive (as well as any other source) to read or write the user's customizations and preferences of the user interface. Thus, for example, information can be read from the type of device described in PCT International Publication No. WO99/19873, published Apr. 22, 1999. In addition, user profile access component 102 contains the programming by which software application 10 can access, use, manage, and change the user profile that resides on server 22. It also contains the programming that permits the user profile to be ejected or erased from the user's computer and synchronized with that stored on server 22. Banner component 104 contains the programming used to access and display an advertising banner specified by ADM module 54. In addition to the drag and drop capabilities discussed above, GUI module 52 can also include the programming necessary to permit dragging of links onto category icons to add them to the associated set of links, as well as dragging of data files (e.g., documents) onto the application icons to initiate execution of the selected application using the selected data file.

ADM module 54 includes a key event component 108, a timer/display component 110, a flag alert component 112, and an error handling component 114. These components are preferably written in ActiveX™ or Java™. User interaction with the computer, whether with the client software application itself or with other applications or the operating system, is monitored by GUI module 52 and reported to key event component 108. As will be understood by those skilled in the art, the detection of user input to other programs and to the operating system itself can be implemented under Windows™ using system hooks. Key event component 108 determines whether the user interaction constitutes a key event; that is, whether a change in displayed banners should be made in response to the user input. If so, it informs timer/display component 110 which contains the programming that determines which banner should be displayed and what computer usage information should be stored for later reporting to ADM server 22. This component also includes a timer that periodically changes the advertisement displayed in banner region 78 in the absence of any user input. The selection of banners will be further described below in connection with FIG. 7.

Once a group of banners have been displayed their allotted number of times, timer/display component 110 notifies flag alert component 112, which sets a new banner flag. This flag is checked periodically and if set, ADM server 22 is accessed to download new banner advertising. If desired, flag alert component 112 can also maintain other flags for use by the system to record the state of various events. For example, it can include a flag that indicates whether the current execution of client software application 10 is the first execution following installation of the software. If so, a special introductory screen could be displayed. Other such uses will become apparent to those skilled in the art. Error handling and messaging component 114 is used to handle error conditions such as, for example, where a user has uninstalled a software application off the computer, but attempts to execute the uninstalled application from an application icon 76 still residing on the applications toolbar. This component can intercept the error message generated by the operating system and take appropriate action such as, for example, informing the user that the application cannot be located and asking whether the user wishes the application icon to be removed from the toolbar. Advertising material in the form of banners can be displayed based on demographic and usage data obtained from the user, and those banners can be displayed periodically during the course of the user's use of the computer. Advertising is provided to the user while the user is on-line, and advertising also is downloaded to the user's computer and stored for later use Thus, advertising can be displayed to the user irrespective of whether the user is on-line or off-line.

As mentioned above, client software application 10 monitors the user's interaction with applications other than itself using system hooks. As will be appreciated, this permits the client software application to alter the normal response seen by the user to certain types of interactions with the computer. For example, GUI module 52 preferably monitors user action and, upon detecting that the user has initiated execution of a browser application, whether via an application icon 76 or directly via the computer's operating system itself, GUI module 52 can override the browser's default home page setting and redirect it to another web site. Preferably, the user is queried via a pop-up dialog box prior to redirection to ascertain whether he or she objects to starting the browser at some web site other than the default home page. This can be used as an additional means of exposing the user to advertising while providing the user with some variety in the use of their browser, since they are not limited to always seeing the same site upon startup of the browser. Other such uses of this feature will be apparent to those skilled in the art.

Notes module 56 provides messaging capabilities not only for personal use by the user, but also for use among different users. From the user's standpoint, the notes themselves comprise small pop-up windows containing short messages or reminders. These notes can be associated with certain events. For example, the user could set up a personal note that pops up at the end of the day when the user goes to exit the application. Alternatively, one user could send another user a note related to sports and could set that note to only pop-up when the receiver either accesses the sports bookmark category icon 80 or accesses a sports-related web site. The notes functions (e.g., creating a new note, sending a note, etc.) can be accessed via Tools under the pull-down menu 70. Notes sent between different users connected to the Internet is by way of ADM server 22, which acts as a messaging server, identifying individual users (whether senders or receivers) by way of their unique ID and handling the receipt and distribution of the notes.

Notes module 56 includes a display component 116, a logic component 118, a registration component 120, and a send/receive component 122, all of which can be written in ActiveX™ or Java™. The notes display component 116 contains the programming responsible for the actual display of the pop-up notes on the monitor. The notes logic component 118 is responsible for the logical processing of the notes; for example, determining when or under what conditions a note will be displayed. Registration component 120 handles registration of the client software application with the messaging server process provided by ADM server 22. The send/receive component interfaces with I/O module 58 and is responsible for the actual transmission and reception of notes over the Internet.

I/O Module 58 is used as the interface between the various program modules and banner storage 30, user data storage 34, the Internet 20, and, if connected, a printer (not shown). It includes a reporting and printing component 124, a streams component 126, and a file I/O component 128. These components can all be written in ActiveX™ or Java™. Reporting and printing component 124 contains the programming code used to properly format and direct data to its proper output device (e.g., a printer, log file, etc.). The streams component 126 is used to manage the input and output functions which establish and provide data transmissions between components and objects. It is this component that is used to access the Internet via TCP/IP and can be used with other communications protocols, such as RMI and COM. The file I/O component 128 is used to manipulate stored files, including those used in the banner data storage 30 and user data storage 34.

Login module 60 (FIG. 4) comprises an ActiveX™ or Java™ login component which includes the programming that provides the user login and password validation features. If desired, this module can also include a security component that provides encryption of data transmitted over the Internet. PDA module 62 is an ActiveX™ or Java™ component that can be used to handle importing and exporting of user data between the client software application and the formats needed for use with a personal digital assistant. Also, this module can be used for interfacing the client software application with the user's current personal information management software, such as Outlook™, Lotus Notes™, or Netscape™ mail. The security module can also include an import/export wizard for use by the user in converting between formats.

Builder module 64 interfaces with all of the other modules and contains the programming used to upgrade individual components of the software application from time to time. As with most of the other modules, it can be written in ActiveX™ or Java™. For purposes of upgrading components, each component has associated with it a version identifier that comprises a version name and version number, with the version name simply being the filename of the component or module.

Builder module 64 is operable to determine the version name and number for each of the components currently installed on the client computer and to generate from that a current blueprint of the components. Then, the next time an Internet connection is available, the builder component can access ADM server 22 and download from it an upgraded blueprint. The builder module then compares these blueprints to determine whether the client software application installed on the computer is the most current version available. If not, the builder, having both blueprints, can determine specifically which new components it needs. Upgrading of existing components is typically accomplished simply by overwriting the existing files and making the appropriate entries into the Windows™ Registry. At the server side, adding new components to the application simply requires creating the new component and upgrading the existing components to work with the new component, followed by adding the new and revised components to the upgraded blueprint. Then, the next time the server is access by the builder module, it will download the new and revised components.

This upgrading process is implemented automatically by the client software application without requiring any user input or initiation of the process. Also, by modularizing the application in the manner described above, bug fixes and upgrading of features can be achieved without requiring downloading and installation of the entire software application. This is especially useful for distribution of software via the Internet, since software applications typically require anywhere from several Megabytes to tens of Megabytes of disk space and the downloading of such large files can be burdensome.

Rather than using builder module 64 to compare version identifiers at client computer 40, builder module 64 can be used to report the version identifiers of the current installation of client software application 10 back to server 22, with server 22 then being used to compare the version identifiers (i.e., the blueprint) with the version identifiers of the most current version available. Then, if one or more program modules needs to be updated, server 22 can then initiate transmission of those modules to client computer 40 for installation by builder module 64.

It may be desirable or necessary from time to time to upgrade the builder module 64 itself so that it can evolve and provide new features not currently anticipated. For this purpose, auxiliary module 66 is provided. Upon builder module 64 determining from the blueprints that it needs to be upgraded itself, it turns over control to auxiliary module 66 and then terminates its execution so that it may be overwritten with the new builder module. Auxiliary module 66 then handles downloading and installation of the new builder module and other components. Builder module 64 can also contain a diagnostic module that is used to provide a diagnostic evaluation of either client software application 10 or some other software application having version identifiers that are recognized by builder module 64. Preferably, this diagnostic capability is implemented as follows. Upon execution of a software application using an icon 76, client software application 10 monitors the execution of the software application and, upon determining that the software application is not executing normally, utilizes builder module 64 to perform a diagnostic evaluation of the software application which can include, for example, checking for corrupted application files (using checksum or other such information), checking for the existence of all necessary files in the proper directories, and checking to determine that all of the program modules of the software application under evaluation have the proper version numbers for the current blueprint of the software application.

Once the problem has been determined, an error message can be generated for the user. Also, client software application 10 can access server 22 to retrieve the program modules necessary to correct the problem. Thereafter, these program modules can be installed using builder module 64 to bring the software application back to a proper operating state.

As will be appreciated by those skilled in the art, builder module 64 or any of the other modules can have their own set of module commands which they use to perform particular functions. These module commands can be used by other modules to access or implement functions provided by that module. Additional module commands and, thus, additional functionality, can be added simply by creating upgraded modules that include the new module commands and using builder module 64 to upgrade to the new modules in accordance with the procedures described herein.

In addition, the server can contain, or have access to, software files that have been prepared by third party software developers for distribution. Such files can be downloaded upon request by a particular user. This third party software can be written in, for example, Java™ so that it uses the execution engine (e.g., a Java Virtual Machine) provided as a part of software application 10. Thus, in a like manner that has been described, third party software developers/distributors are provided with a distribution tool to distribute, upgrade, service and maintain their software. Furthermore, because each individual's user profile is maintained on a network server, that individual's customized settings for the software application can be the same, irrespective of the computer that the user employs on that network. That is, the user's preferences and custom settings for the operating system and applications can be maintained, even though the same user may operate different installations of the software on different computers.

Referring now to FIG. 7, the details of the selection and use of banner advertising will now be described. In general, banners are displayed either in response to some user action (input) or, in the absence of user input, are displayed periodically at timed intervals. The client software application monitors the user's inputs to the computer and, when possible, targets the banner advertising displayed so that it relates to the what the user is doing or has an interest in, as evidenced by activities associated with the user's use of the computer.

Preferably, the banner advertisements are stored as graphical images on the client computer's hard drive and are replaced once they have been displayed a certain number of times. As mentioned above, this is accomplished by downloading new banner advertisements from ADM server 22. To avoid running out of banners before new ones can be downloaded from ADM server 22, client software application 10 maintains a plurality of sets of locally stored banners and, at any one time, only displays banners contained in one of the sets. Then, when the banners in that set have all been displayed the allotted number of times, the next set of banners is used with the old set being replaced the next time that server 22 is accessed.

A banner database 130 is stored on the client computer's hard drive along with the image files themselves. This database contains information that is used by timer/display component 110 to determine when the banner should be displayed. In the representation of banner database 130 shown in FIG. 7, each row is a data set that is associated with a different one of the banners. The columns represent individual data items within each data set. The data for each banner includes the filename of the image file, a destination link, one or more associated category identifiers, one or more associated trigger links, one or more associated programs, and a priority level.

The destination link is (typically) the URL of the web site to which the default browser will be directed if the user clicks on the banner while it is displayed. The category identifiers specify those categories to which the banner relates and can correspond exactly to the categories used in connection with the bookmark category icons 80 discussed above in connection with FIG. 5. For example, an advertisement for a securities brokerage would be related to finance and possibly business. By associating those category identifiers with the banner in database 130, ADM module 54 will be able to determine the proper time for display of the brokerage advertisement. The associated trigger links specify locations for which the associated banner should be displayed when one of the specified sites are accessed. In the first example given in FIG. 7, if the user were to direct his or her browser to www.lotus.com/123, ADM module 54 would display the banner01.gif image. Where multiple banners are associated with the same link, ADM module 54 determines which of the banners should be selected based upon another criteria such as number of times each banner has previously been displayed. The associated programs column is similar in that execution of one of the specified applications (rather than a visit to a web site) will result in an associated banner being displayed. Finally, the priority level is used to determine the specificity of the targeting of the advertisements.

More specifically, ADM module 54 is programmed to select and display banners at any one of three different levels of processing. The first is the general level, which is the default priority level at which the processing is set when the client software application is first executed. In this mode, only banners having a general priority level will be displayed. The second level is the medium processing level, in which both medium and general banners are displayed, but at a weighting that favors the medium banners. Preferably, when operating in this mode, only one general priority level banner is displayed for every three medium level banners. Similarly, the third level is the high level at which high, medium, and general banners are displayed, with ten high priority level banners being displayed for every three medium level banners and for every one general level banners. The processing level at any one time is determined by the user's actions. In particular, when the user begins execution of an application or selects one of the bookmark category icons 80, the processing level is set to medium so that no high level banners will be used for display. When the user selects a link, the processing level changes to high at which point all banners are candidates for display, with the high priority level banners being given favoritism in the 10-3-1 ratio mentioned above. This ratio can be adjustable by ADM module 54, if desired.

It will be appreciated that other data items for the banners can be included in database 130. For example, each banner can have associated with it a maximum number of permitted displays, with this number being decremented each time that the banner is displayed. This allows different advertisements differing amounts of exposure. Similarly, each banner can have associated with it a weighting or frequency that is used by ADM module 54 to determine how often the banner should be displayed relative to other banners at the same priority level. A "display first" property can also be provided for any particular banner that indicates that it should be displayed before others at its same priority level, with timer/display component 110 providing the programming needed to insure that only one such banner at each priority level has this property set. Apart from the category identifiers, each banner can also have a number of keywords associated with it and ADM module 54 can be programmed to examine the web pages visited by the user to determine if any of those keywords are present, whether they be located in the web page as META TAGs or simply contained in the text of the page. If so, one of the banners associated with the located keyword could be displayed.

As will be apparent to those skilled in the art, client software application 10, acting in conjunction with ADM server 22, provides a two-tiered approach to targeted advertising. The first tier is the initial selection of banners to be downloaded to the user based upon the user's demographic information. The second tier is the reactive targeting of the advertisements based upon user interaction with the computer. Moreover, since client software application 10 communicates with server 22 from time to time and can report back computer usage information as well as information concerning the display of the banners, this information can be associated with the user's demographic information (by way of their unique ID) at the server and then used by the advertisers to help them better understand the consuming public. Thus, the present invention concerns a manner or method in which an advertiser can be provided with real time information regarding a user, reactions of groups of users, reaction to the effectiveness of a particular advertisement or message, and the like.

As will be appreciated by those skilled in the art, the reactive targeting provided by client software application 10 is handled in real time, rather than simply as a part of building a set of advertisements for later display to the user. This permits the display of advertising that is relevant to what the user is doing at any particular time. Thus, if the user is using the computer to search for information on stocks, then client software application 10 can detect this (whether by recognizing the web site being accessed, the keywords used in the web pages being accessed, the program being executed, or some other aspect of the user's search) and can display an advertisement that is relevant to this topic, whether it be for a stock brokerage, a stock exchange, an investment group, or some other organization. Furthermore, for user computers that enjoy a full time connection to the Internet, the reactive targeting can be used to access a specific advertisement over the Internet, rather than from a pre-stored banner from banner storage 30. This can be accomplished by replacing the local image filenames in the first column of banner database 130 with an Internet address of a specific image file. Alternatively, the user's actions that are used to select an advertisement via banner database 130 can be sent to ADM server 22 or some other advertising server as posted form data, with the server using the data to select and download an appropriate advertisement. This permits real time targeting of advertising while expanding the available pool of advertisements without having to previously download the complete set of advertisements to the user's computer.

Figure 8:
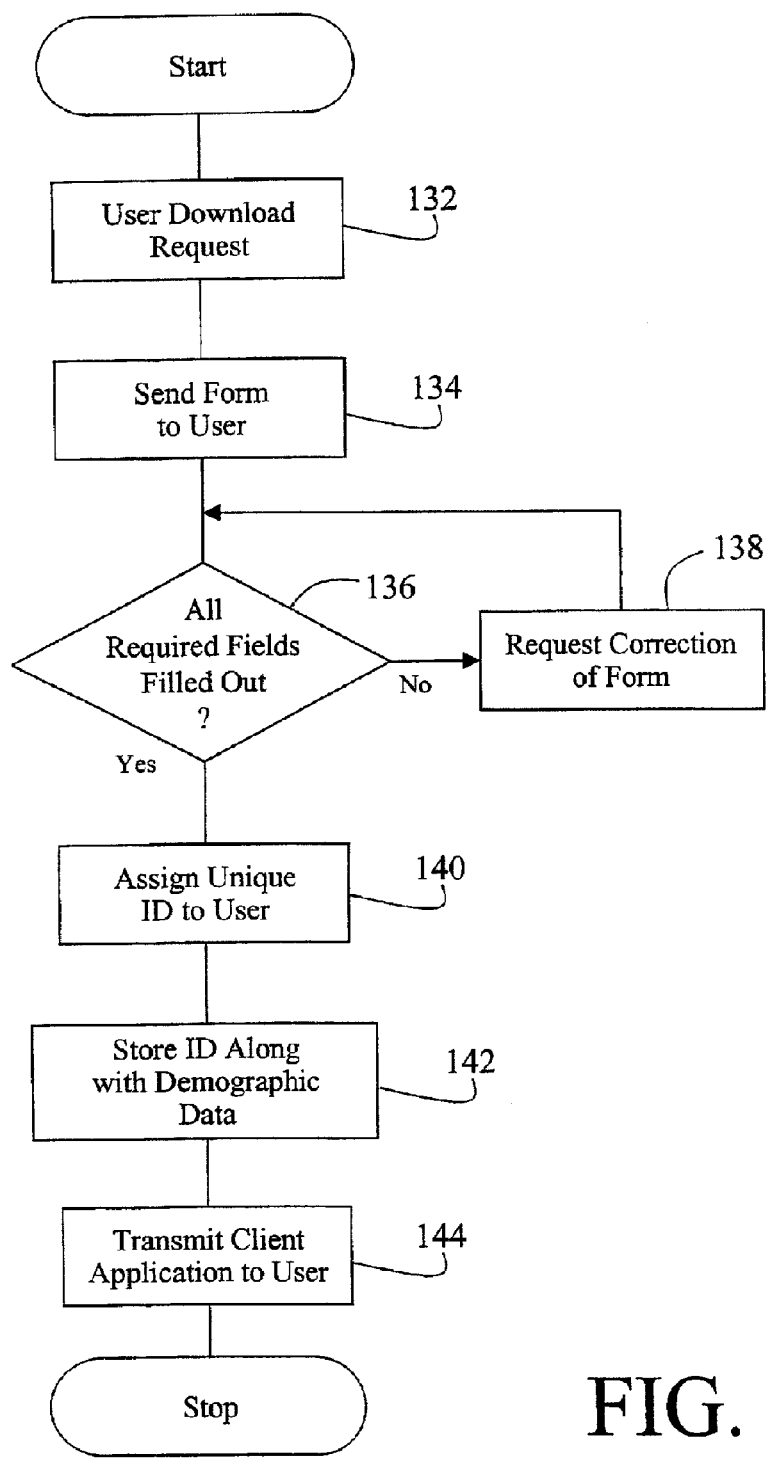
FIG. 8 depicts a method for providing access to the client software application and for obtaining and utilizing demographic information regarding users of the software application.

Referring now to FIG. 8, the process for providing access to the client software application and for obtaining and utilizing demographic information regarding the user will now be described. As will be appreciated, the software download and data gathering process of FIG. 8 can be implemented by a suitable server program residing on ADM server 22. As indicated at blocks 132 and 134, in response to server 22 receiving a download request from a user, the server sends a form to the user and then waits for the completed form to be posted back to the server. The form can include a number of required fields that provide the minimum data needed to generate a proper demographic profile of the user. Exemplary user information includes age, sex, region of residence, education level, occupation, interests and hobbies, recent major purchases, income level, and the like. Other information that can be provided includes identity of computer network service, electronic mail service, computer and monitor type, computer operating system, browser application, and the like. Personal information, that is used for accounting and user identity purposes for future usage, but most preferably not for targeted banner advertising purpose, include name, address, user name and password of the user. Other information regarding the user includes whether the user is an initial user or a guest user. Other personal information, such as credit card information also can be provided. However, such information can be maintained within a secure location within the server, and not used in other network transactions, such as over the Internet. For example, credit card information can be maintained in a secure location within a user's personal profile; commercial transactions initiated by the user can be transacted by ultimate transfer of the credit card information between computers in a secure manner (e.g., between the server and a computer authorized to conduct, in a secure manner, collection for credit card based transactions).

Once server 22 has received the completed form, a check is made to determine whether all of the required fields have been completed, as indicated at block 136. This check can include a certain amount of validity checking of the data. For example, if the user is required to specify the city and state in which they live, a check could be made to determine whether the city and state reported by the user actually exists. Similarly, a reported area code could be checked to determine its validity. If required information is missing or invalid, flow moves to block 138 where the server resends the form with a request for correction. As is known, this can include an identification of the particular required data that was missing or invalid. Once server 22 receives a correctly completed form, flow moves to block 140 where server 22 assigns a unique ID to the user and then stores that ID along with the received demographic data, as indicated at block 142. As discussed above in connection with FIG. 3, this data is stored in the user/demographics data base 46. Then, an initial set of banner advertisements and links are selected based upon the user's zip code, indicated at block 144. The links are used to provide an initial set of links for each of the bookmark categories represented by icons 80. Thereafter, client software application 10 is downloaded to the user's computer for installation by the user, as indicated at block 146. Preferably, the client software application is packaged as a single, self-extracting ZIP file and includes an installation program that handles installation of the program and all of its components into proper directories, as well as making the necessary entries into the Windows™ Registry.

The client software application is provided as an installation file for a computer, and can be transferred to the user's computer from a web site. The installation file typically is provided as an executable file, and the file will execute an installation procedure, such as that produced by the InstallShield™ product. Preferably, the installation procedure allows installation of the components of the application in the appropriate directory structures, and allows the user to specify the root directory for those directory structures of the application. It can be necessary for prompting the user for configuration parameters needed for installation. Execution of the installation file results in a copy of the client software application being appropriately installed on the computer, along with appropriate operating system shortcuts and other objects allowing a user to access the installed application. The application preferably comprises default bookmarks, which are supplied by the server, but which may be altered by the user. The server typically has no initial information regarding the user; however, upon first attempt at installation, the application attempts to establish a network (e.g., Internet) connection to the server. The application declares itself a new installation of a client software application, and the server provides an identifier for subsequent identifications between the application and the server. User identification provides individual users with the ability to receive advertising banners that are specifically targeted to a specific user from among multiple users that may be registered at a particular computer or through a client software application; as well as the ability to ensure that the set of applications shortcuts, web hyperlink channels, and the organization of resources set up by an individual user are reproduced when that specific user's accesses the client software application.

The first time a user logs onto client software application 10, whether as part of a new installation of the software or using an existing installation, the user profile is set up and is initially loaded automatically with preference data and customized settings obtained from the operating system and other software installed on the computer. Also, the user's existing address books residing in other applications are accessed and the contents copied to the user profile using a suitable import utility. Templates, macros, and other such custom files can also be copied to the user profile at this time.

The user profile associated with each user can be accessed from different installations, irrespective of the computer or operating system that the user employs. In effect, the information regarding the user, including the user profile is transportable, and as such, some attributes that are properties or files of the client software application and some attributes that are properties of the particular user installation are accessible to the user anywhere on the network. For example, for a user profile that includes user identification data, user hyperlink bookmarks, user hyperlink categories, and user application shortcuts, those components of the profile are accessible from server 22, including resource names, icons, and the like. In addition to the ability to distribute and upgrade software, the present invention possesses the ability to incorporate key components into the user's profile. When the user receives his or her profile, these components work in conjunction, with software residing outside of the software of the present invention. Theses components allow the software the ability to customize previous settings that the user has established for that software.

The user ID that is stored along with the demographic data is used to anonymously identify the user for the purpose of demographically targeting advertising to that user. This can be accomplished by assigning the user ID to the particular copy of the client software application downloaded by the user. Alternatively, the user ID can be included in a cookie placed by server 22 on the user's computer 18 and this cookie can be accessed by server 22 each time computer usage information is sent to server 22 so that the ID can be associated with the computer usage information. In the illustrated embodiment, the user ID is associated with a user login that is required each time the client software application is executed. By having the user login to the application, it can identify which demographics are associated with this particular user. Also, the provision of a user login allows the client software application to be utilized by multiple users, while permitting different demographically targeted advertising to be displayed for each user. This will now be described in connection with FIG. 9.

Figure 9:
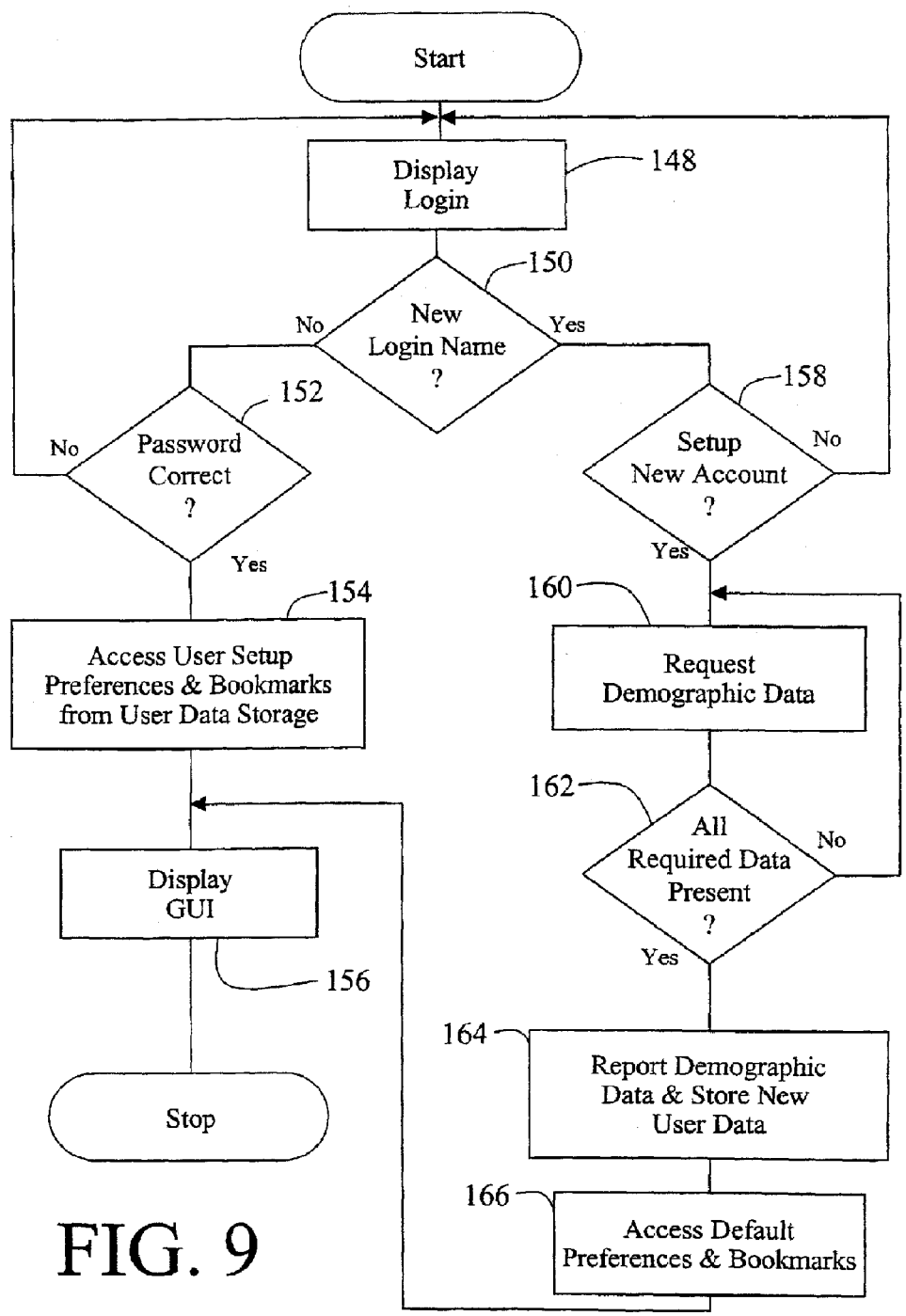
FIG. 9 is a flow chart of the portion of the client software application of FIG. 4 that handles user login as well as acquisition of demographic information for new users of the application.

As shown in FIG. 9, upon execution of the client software application 10, a login and password input box is displayed. This is shown at block 148. Once the user has entered a login name, a check is made at block 150 to determine whether the user name is new. If not, a check is made at block 152 to determine whether the password provided for the recognized login name is correct. If not, flow returns to block 148 where the login box is again displayed. If the password is correct, flow moves to block 154 where the application accesses the user's set of preferences and customizations for the display of the graphical user interface. The application also accesses the banner database and various bookmark categories for that user which, as described above, contains for each category of information a number of links to different information resources. Flow then moves to block 156 where the graphical user interface is displayed along with a first banner. The login names and associated passwords can be stored in the user data storage 34. Similarly, the user preferences, categorized lists of bookmarks, and banner database can be stored in user data storage 34. Optionally, the login and password are used to provide an identification of the user to the server 22 so that the user profile and user library may be accessed and incorporated into the graphical user interface provided by the client software application.

If, back at block 150, the login name is determined to be new, the user can be queried as to whether they would like to set up a new account, as indicated at block 158. If not, then flow returns to block 148 where the login screen is again displayed. If a new account is desired, flow moves to block 160 where the application requests various demographic data, which can be the same data requested of the user who originally downloaded the application from server 22. At block 162 a check is made to determine whether all required demographic data was provided. If not, flow returns to block 160 to again request the required data. Once all required information has been provided, flow moves to block 164 where the application reports demographic data back to server 22, receives an assigned ID from the server, and stores the new user data at the client computer in user data storage 34. Flow then moves to block 166 where default preferences and bookmark lists are accessed and assigned to the new user. Flow then moves to block 156 where the graphical user interface is displayed, at which point the user can begin normal use of the application.

If desired, all user-specific information, including logins, password, demographic data, assigned ID, preferences, banner database, and bookmark lists can be stored together as a separate file and treated as a separate user object. This file can be both stored locally on client computer 40 and reported back to server 22. Moreover, this single file can then be used to transfer the user specific data between different computers upon which the application resides. By storing the demographic data at the client itself, demographic targeting of advertising can be accomplished if desired by client software application 10 itself. Furthermore, in situations in which the computer operating system requests a login as a part of boot-up of the computer, or in networked environments where a login at the computer is required for network access, client software application 10 can use the identification of the user provided by these logins rather than requiring a separate login upon execution of the application itself. This allows the client software application to determine who is using the computer without having to request a separate user login.

Figure 10:
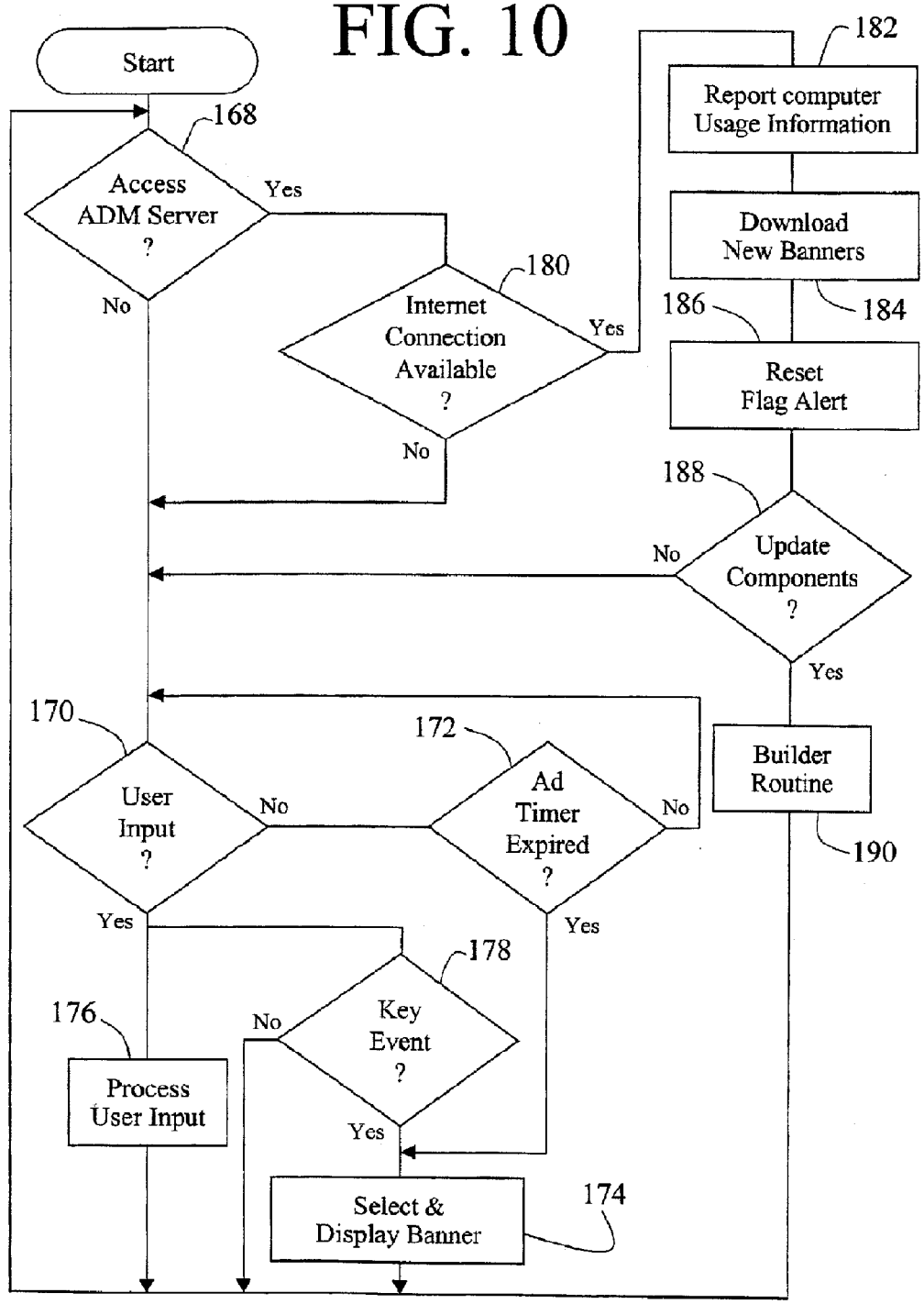
FIG. 10 is a flow chart depicting an overview of the core operation of the client software application of FIG. 4.

Turning now to FIG. 10, there is shown an overview of the core operation of client software application 10. The first step is at block 168 where a check is made to determine whether access to ADM server 22 is needed. Access may be needed to report computer usage information or to download new banner advertising, for example. If no access is currently needed, flow moves to block 170 where a check is made to determine if there is any user input to the computer. If not, flow moves to block 172 where a check is made to determine whether the timer operated by timer/display component 110 has expired. If not, no action is taken and flow returns to block 170 to again check for user interaction with the computer. If the timer has expired, flow moves to block 174 for selection and display of a suitable banner. If, at block 170 user input was detected, flow moves to block 176 where the user input is processed. Flow also moves to block 178 where a check is made to determine whether the user interaction constitutes a key event. If not, flow returns to block 168 and the process repeats. If a key event is detected, then flow moves to block 174 where the key event is processed.

If, at block 168 it was determined that access to ADM server 22 is needed, flow moves to block 180 where a check is made to determine whether an Internet connection is available to the client computer. If no connection is available, the server cannot be accessed at this time and flow therefore moves to block 170. If an Internet connection is available, flow moves to block 182 where the current computer usage information is reported to ADM server 22. Then, if necessary, the client software application downloads new banners, as indicated at block 184. Flow then moves to block 186 where the new banner flag is reset along with any flags used in reporting of computer usage information. At block 188 a check is then made to determine whether any of the components of software application 10 need to be upgraded. If not, flow moves to block 170 to look for user interaction. If a newer version of one or more components is available, flow moves to block 190 where the builder routine is executed.

Figure 11:
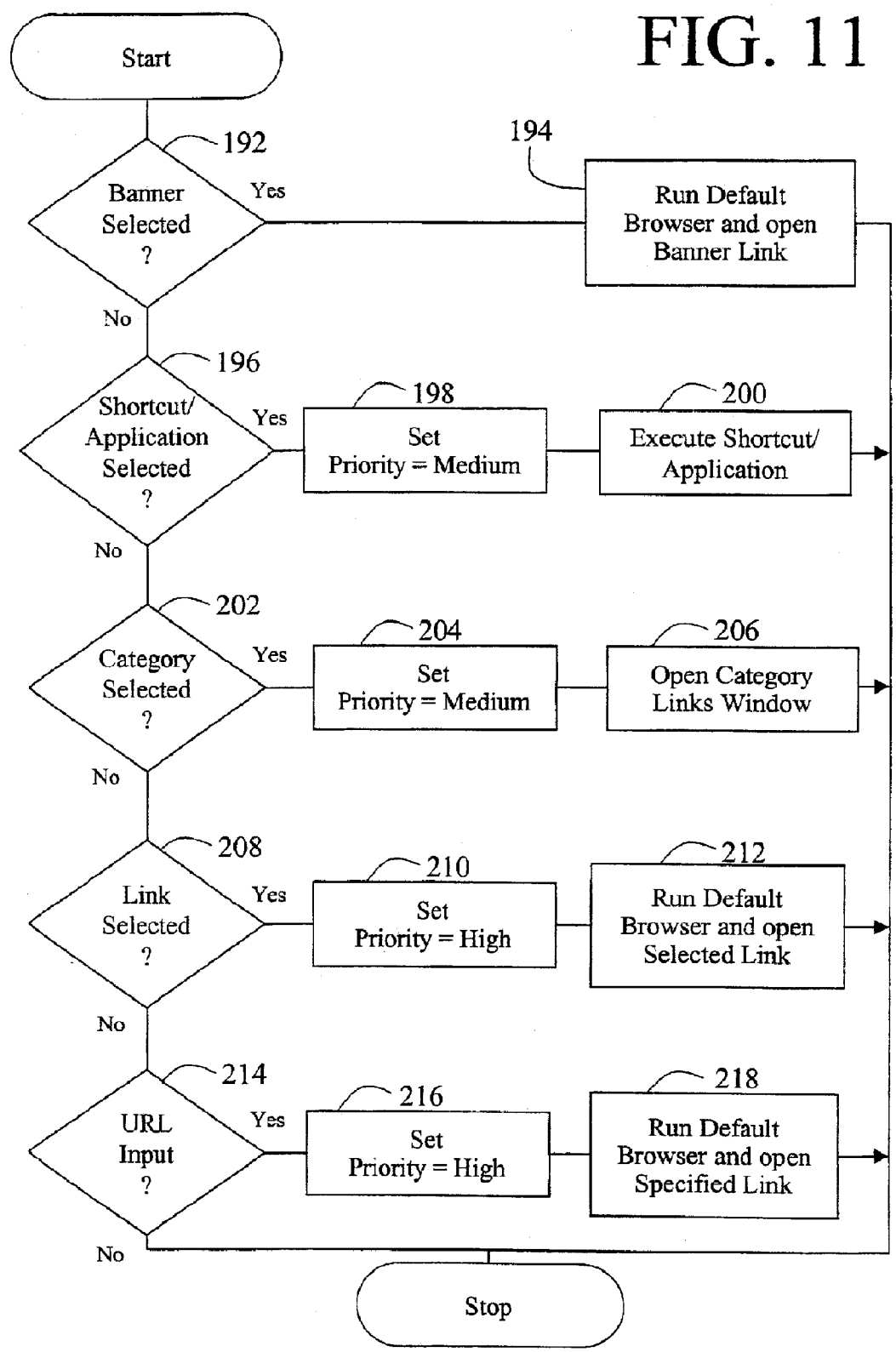
FIG. 11 is a flow chart of the processing of user input that is carried out by the client software application of FIG. 4.

Referring now to FIG. 11, the processing of user input represented by block 176 of FIG. 10 will now be described. This processing begins at block 192 where a check is made to determine whether a user has selected a banner by, for example, a mouse click on the banner itself. If so, flow moves to block 194 where the URL associated with the selected banner is accessed and the user's default browser used to access the site specified by that URL. This process then ends with the flow returning to block 168 of FIG. 10. If at block 192, a banner has not been selected, flow drops down to block 196 where it is determined whether a shortcut or application has been selected. This includes any of the application icons 76 on the application's graphical user interface itself or a shortcut or application selected from the Windows™ desktop. If so, flow moves to block 198 where the priority is set to medium following which flow moves to block 200 where the shortcut or application is executed or otherwise processed in accordance with the normal operation of the operating system. If at block 196 it was determined that no shortcut or application was selected, then flow moves to block 202 where a check is made to determine whether one of the bookmark category icons 80 was selected. If so, flow moves to block 204 where the priority is set to medium, following which flow moves to block 206 where a second application window is opened displaying the links associated with the selected category. If at block 202 no category was selected, then flow moves to block 208 where a check is made to determine whether a specific bookmark or link was selected by the user. If so, flow moves to block 210 where the priority is set to high, following which the default browser is run and the web page specified by the selected link is accessed. If at block 208 no link was selected by the user, flow drops down to block 214 where a check is made to determine whether the user has entered a URL or other web page address into URL text field 74. If so, flow moves to block 216 where the priority is again set to high following which the default browser is opened and the specified link is accessed, as indicated at block 218. If at block 214 no URL was inputted, then no further action is taken by client software application 10.

Figure 12:
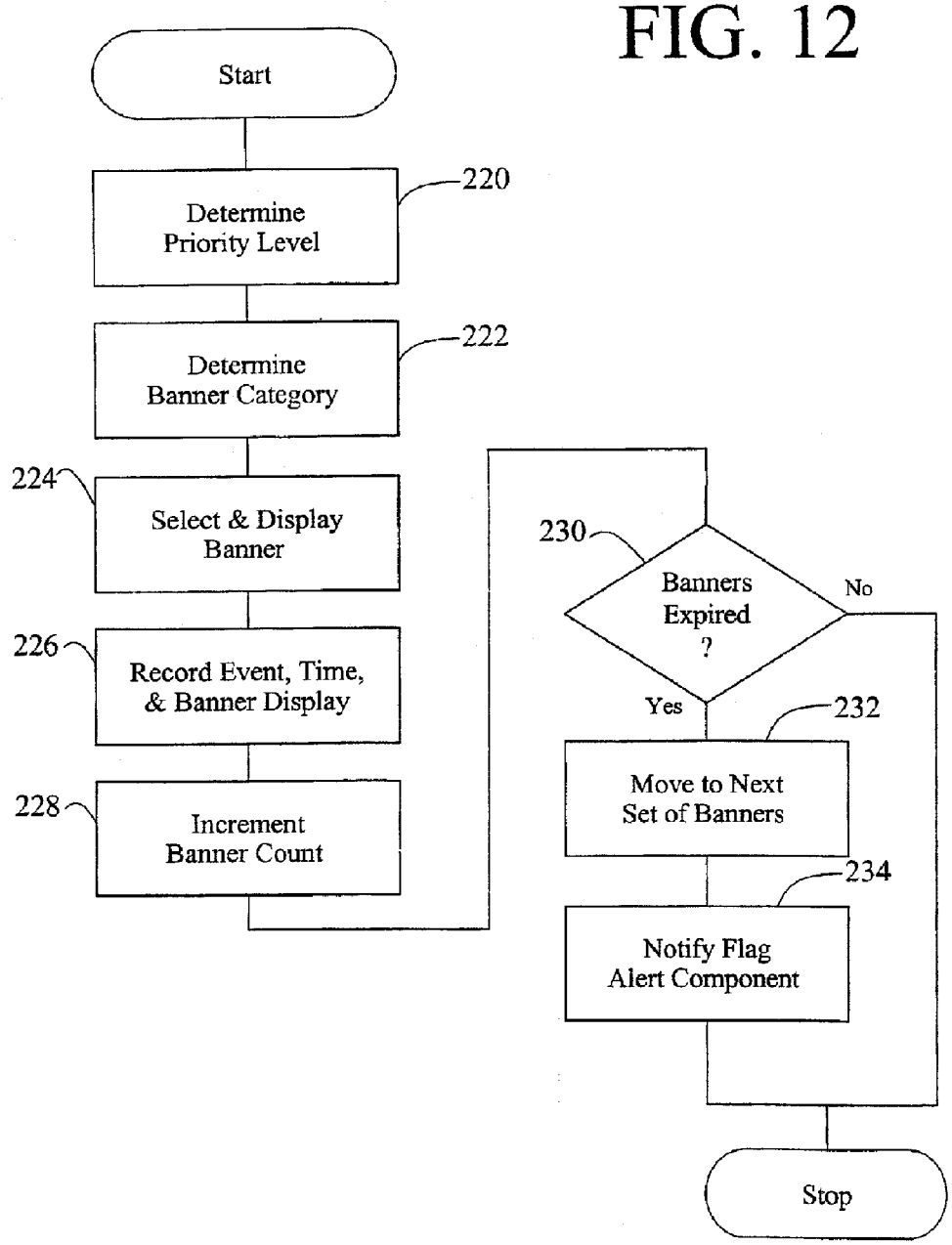
FIG. 12 is a flow chart of the processing of key events that is carried out by the client software application of FIG. 4.

Turning now to FIG. 12, the processing of key events represented by block 174 of FIG. 10 will now be described.

As indicated at block 220, the first step is to determine the current priority level which, as discussed in connection with FIG. 11 may have been set from the default general priority level to either medium or high. Flow then moves to block 222 where, in the case of the priority being either medium or high, the selected category of information (finance, news, sports, etc.) is determined so that only those banners associated with that category can be selected as candidates for display. Then, at block 224, using the determined category a particular banner is selected and displayed in the banner region 78. As previously discussed, in addition to an associated category, the banners can also be selected based on associated links and/or programs in the event, for example, that the user accesses a web site that is listed in the banner database 130. Flow then moves to block 226 where a record is made of the occurrence of the event, the display of the banner, and the time that the event occurred. This computer usage information can now be reported back to ADM server 22 or a reporting flag can be set so that this information can be reported back the next time that the server is accessible. Flow then moves to block 228 where the banner count associated with the displayed banner is incremented by one. Then, at block 230, a check is made to determine whether the current group of banners has expired, based on their banner counts. If not, the key event processing is finished and flow then returns to block 168 of FIG. 10. If the banners have expired, then flow moves to block 232 where the next available set of locally stored banners is utilized for display purposes and the flag alert component 112 is notified so that it can set the new banner flag, as indicated at block 234. Processing then returns to block 168 of FIG. 10. Thus, the present invention provides a manner or method for actually displaying banners to users after installation of the client software application.

Alternatively, other algorithms can be applied so as to determine the particular timing of display of banner advertisements. One algorithm that can be used for determining banner display, as well as timing and duration of display involves selection of an eligible set of banners from a total set of banners available for installation, based on certain criteria. Such criteria include, for example, whether the banner is directed to the currently logged-in user of the client application software; whether the banner has been presented to the currently logged-in user fewer times than the banner is allowed to be displayed to the user; whether the banner has been presented less frequently than the maximum frequency that the banner is allowed to be displayed to that user; whether the date of consideration of the banner has passed; and whether the date that the banner will be considered out of date is in the future. Other representative criteria include the priority value (e.g., high, medium or low) assigned to a particular banner for each user; and such criteria can be used to allocate time to that banner in competition with other banners. For example, a set of eligible banners assigned with a priority of "high" can be displayed in rotation; a set of eligible banners assigned a priority of "medium" can be displayed in rotation; and a set of eligible banners assigned a priority of "low" can be displayed in rotation; and then the banners can be displayed in a sequence by selecting a banner from each priority value in a time-wise sequence such as three high value banners in succession, followed by one medium value banner, followed by three high value banners in succession, followed by one medium value banner, three high value banners in succession, followed by one low value banner, followed by repeat of such a sequencing formula. In such a sequencing method, if a banner of a particular priority level is unavailable, it preferably is omitted from that sequence. However, upon the event of the occurrence of a specific stimulus, such as user action or a periodic expiration of a previous banner, the display of a new banner occurs within the aforementioned sequence; and that sequence can continue in its normal fashion after the completion of the period of insertion of that new banner into the sequence.

Figure 13:
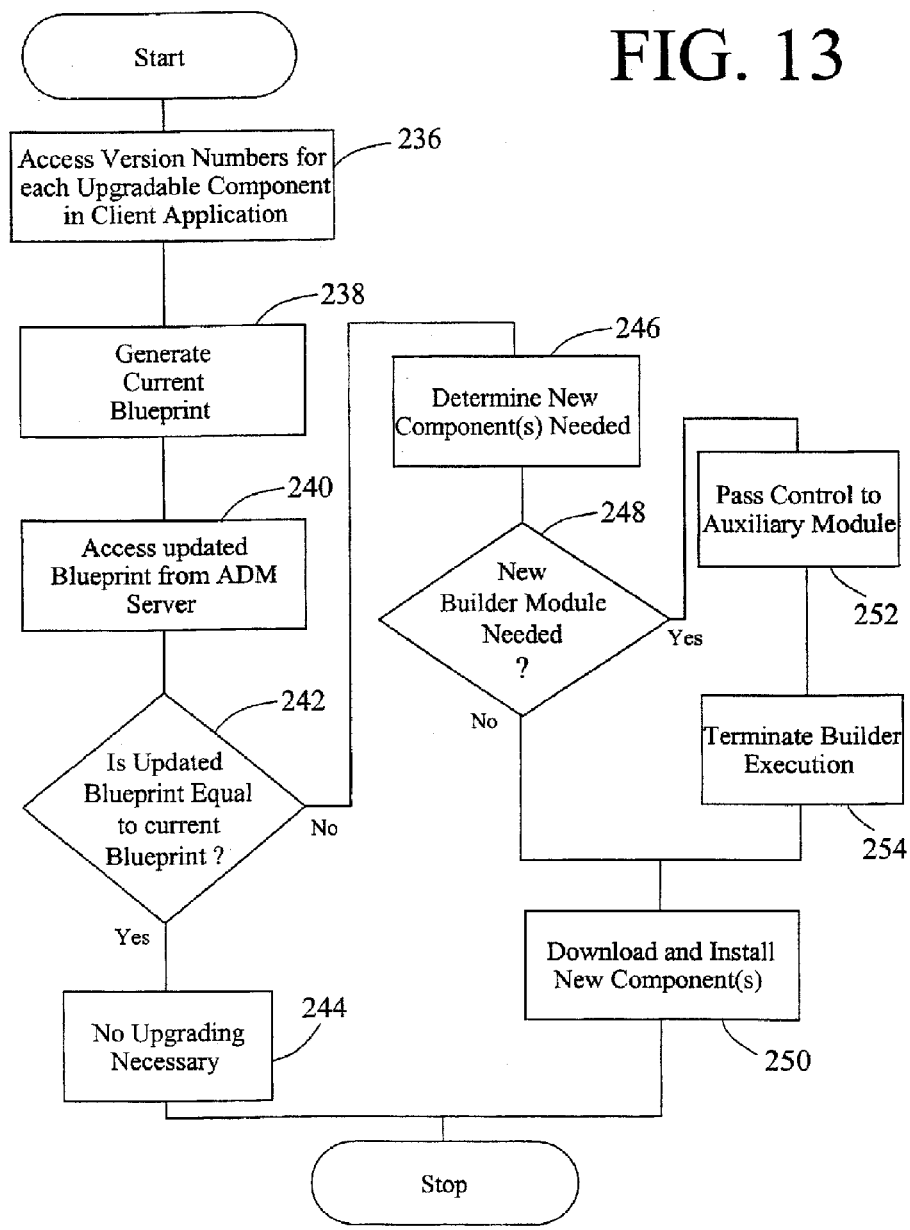
FIG. 13 is a flow chart of the process used by the builder module of FIG. 4 to upgrade different program modules or components used in the client software application.

Referring now to FIG. 13, a first implementation of the builder routine 190 of FIG. 10 will now be described. The process begins at block 236 where the builder component 64 accesses version numbers for each component in the client software application. Flow then moves to block 238 where, using this information, builder component 64 generates a current blueprint. Then, at block 240, the builder component accesses an updated blueprint from ADM server 22. At block 242, a check is made to determine whether the updated blueprint is the same as the current blueprint. If so, the client computer has the upgraded version and no upgrading is necessary, as indicated at block 244. Flow then returns to block 168 of FIG. 10. If, at block 242, the updated blueprint is different from the current blueprint, flow moves to block 246 where the builder module determines which components are new or need upgrading. Flow then moves to block 248 where a check is made to determine whether the builder module itself needs to be upgraded. If not, flow moves to block 250 where the new or upgraded components are downloaded from server 22 and installed. If an upgraded builder module is needed, then flow moves from block 248 to block 252 where control is passed from the builder module to auxiliary module 66, following which flow moves to block 254 where execution of the builder module is terminated so that it may be overwritten with the new builder module. Flow then continues to block 250 where the builder module and other upgraded components are downloaded and installed under control of auxiliary module 66. Flow then returns to block 168 of FIG. 10.

Figure 14:
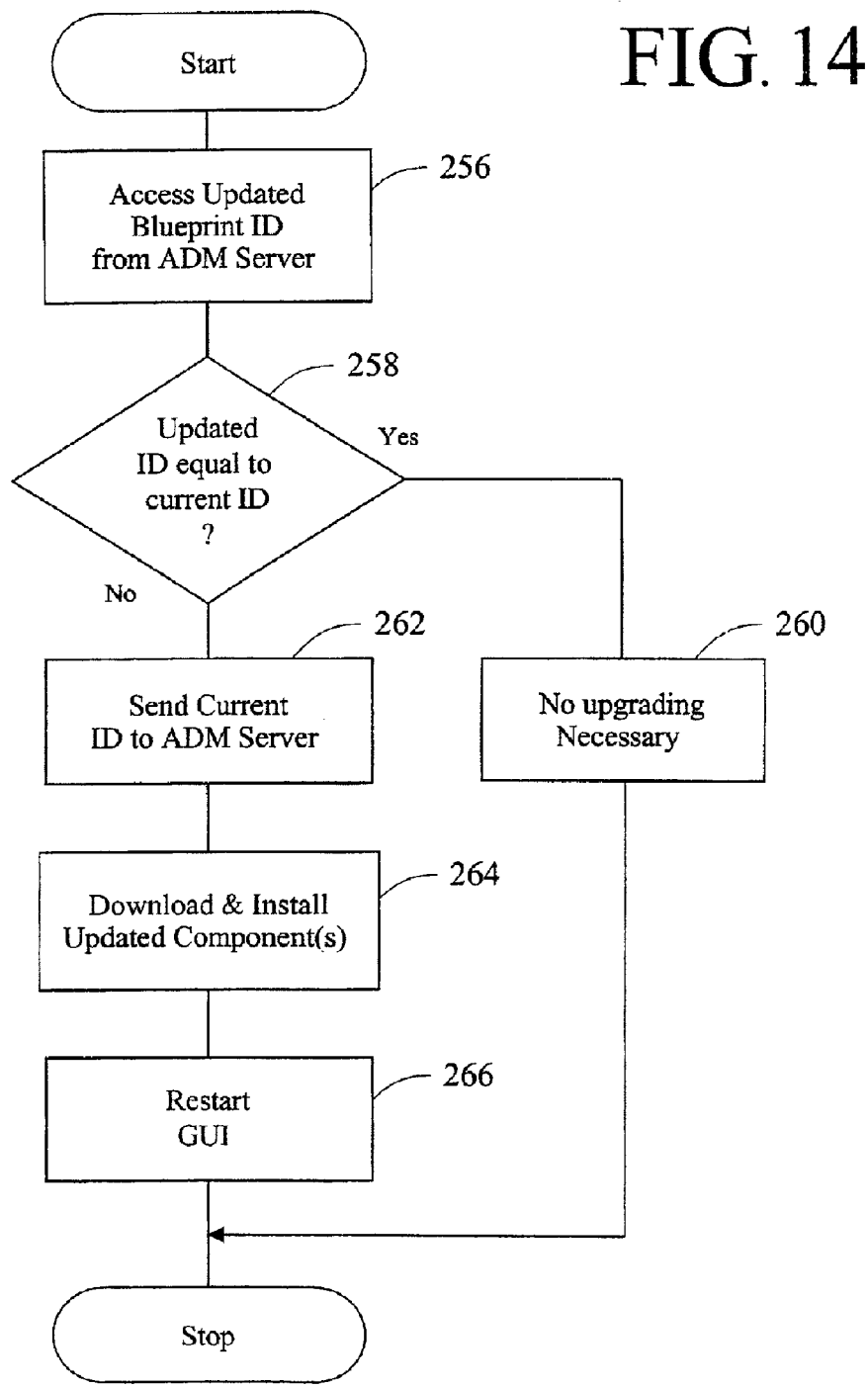
FIG. 14 is a flow chart of a alternative process that can be used by the builder module of FIG. 4 to upgrade program modules or components used in the client software application.

Referring now to FIG. 14, another embodiment of builder routine 190 of FIG. 10 will now be described. In this embodiment, the builder module does not determine the current names and version numbers of all the modules that make up client software application 10, but rather uses a version ID associated with the application to determine whether upgrading of any of the components is necessary. The process starts at block 256 where the builder module accesses an updated blueprint ID from ADM server 22. Then, at block 258, a check is made to determine whether the updated ID is the same as the current version ID. If so, then no upgrading of components is necessary as indicated at block 260 and flow returns to block 168 of FIG. 10. If the ID's are not the same, flow moves to block 262 where the builder module sends the current version ID back to ADM server 22. This current ID is used by ADM server 22 to determine which components need to be downloaded and installed at the client computer so that it has the most recent version. Then, at block 264, the builder module downloads and installs the updated components, following which the process returns to block 168 of FIG. 10. As with the process of FIG. 13, auxiliary module 66 can be used in the event of upgrading of builder module 64 itself. As will be appreciated by those skilled in the art, once the new components have been downloaded and installed, whether by the process of FIG. 13 or FIG. 14, restarting of the computer may be necessary. In addition, the server can contain, or have access to, software files that have been prepared by third party software developers for distribution. Such files can be downloaded upon request by a particular user. Thus, in a like manner that has been described, third party software developers/distributors are provided with a distribution tool to distribute, upgrade, service and maintain their software.

Figure 15:
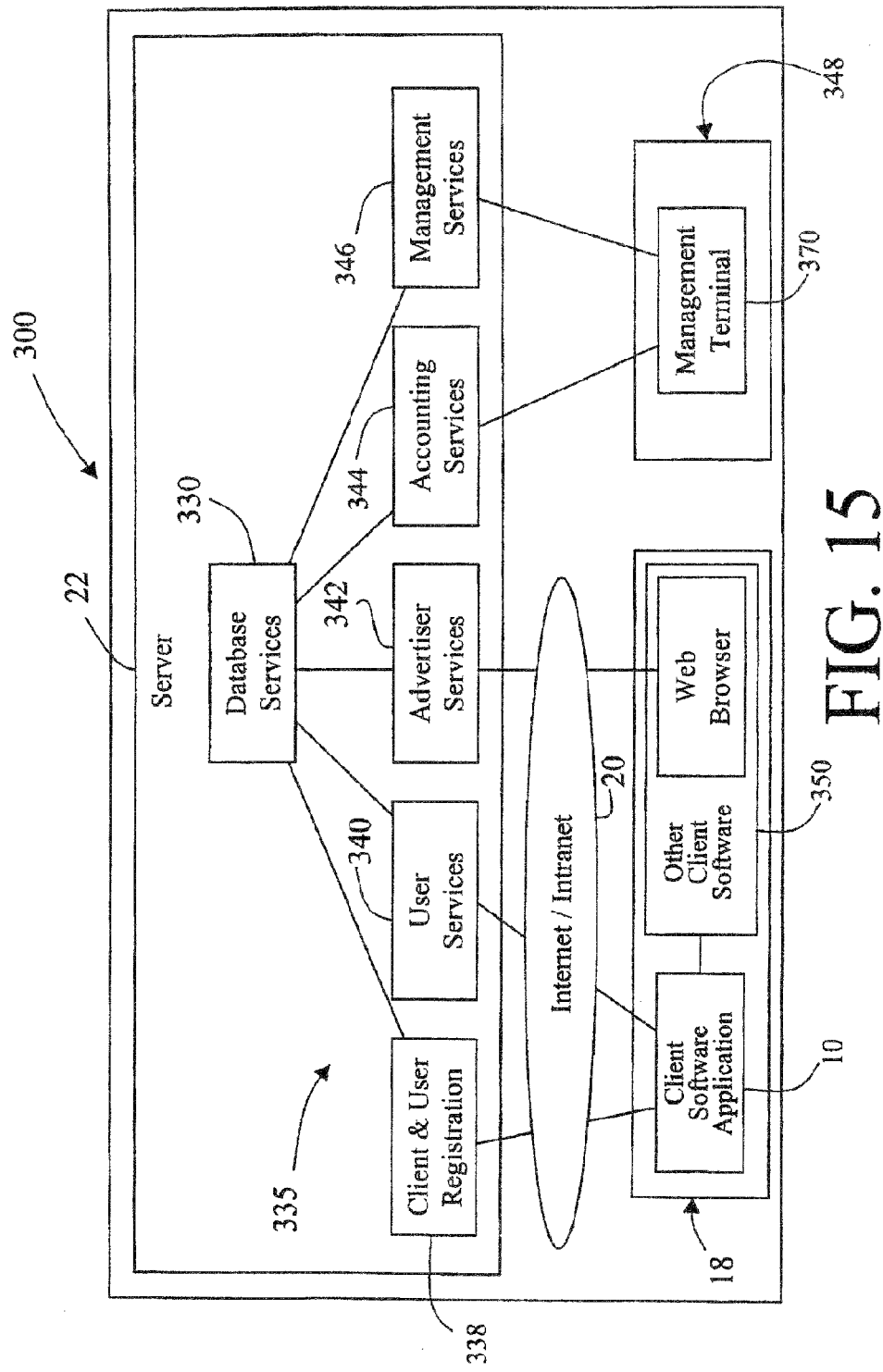
FIG. 15 is block diagram of an embodiment of the invention depicting a server that includes several database services program modules and that is accessible by a client computer via the Internet.

Referring to FIG. 15, there is shown an overview of a computer system 300 including a client software application 10 and a server 22. The server includes a database services system 330 that comprises several other program modules 335. The database services system 330 possesses those capabilities required to support the database requirements of the other components and modules, as well as the activities of personnel performing database administration functions. The program modules 335 include a client and user registration module 338, a user services module 340, and advertiser services module 342, and accounting services module 344 and a management services module 346. Working together, the program modules 335 act as a single software application that provides the computer user with a fully integrated interface to client software 350 (e.g., software applications) on the user's computer 18, as well as to information resources located on a network 20, such as the Internet. Those program modules 335 also can provide file management capabilities. Preferably, the client software 350 is connected to the client and user registration module 338 and user services module 340 via network 20; while Internet browser software 362 can be connected to the advertising services module via network 20. Preferably, the accounting services module 344 and the management services module 346 are connected to a management terminal 370, which most preferably is located on a separate computer 348 and most preferably is not located on network 346. The client software application 10 may also include other executables, support files, and libraries that are used by program modules 335.

The client and user registration module 338 provides the capabilities required to establish a new user or to establish an existing user who has moved to a different computer. The user services module 340 provides the capabilities required to interact with the components of the client software of the user's computer in order to implement and manage the features and benefits realized at the user's computer. The user services module 340 provides for recordation of usage information, delivery of targeted advertising material to users, support of network bookmarks for the user, and applications support for the user. The advertiser services module 342 provides those capabilities required to deliver services required in support of advertisers employing the system for the purpose of delivering advertising to users. The advertiser services module 342 provides for capture and maintenance of advertiser registration information, management of advertiser account status, receipt of advertising material, presentation of user demographic data, and management of targeting advertising designations. Module 342 can acquire, from the server, files (e.g., in gif format) containing advertising banners; those files can be transferred using ftp protocol; and controlling data and information can be obtained with each file in order that direction regarding presentation of the banner advertising is provided. The accounting services module 344 provides those capabilities required to support personnel performing business functions associated with advertiser account management, account and payment status, billing and invoicing activities, review of advertising banners that are proffered, and other business, financial and accounting functions. The management services module 346 provides those capabilities required for personnel performing system administration functions associated with the ongoing management, maintenance, operation, monitoring and upgrading of the system.

The client and user registration module 338 maintains a list of users registered to use a particular installation of the relevant software, and transfers updates to the list to the server 22, and it is possible that a user can possess more than one installation. One user of the installation is recognized as the owning user of the installation. At any time that the application is active, it will have identified a current user from the list of users registered for that installation. As such, the module thus invokes the user profile of the particular, current user. When the application is used on a computer using an operating system such as Windows NT, or any other operating system environment that enforces rigorous access controls, it can use the user identity derived from the Windows NT log-in procedures. For example, the application can match the Windows NT log-in identity against a table of users registered for that machine, and can invoke the user profile of the user who has previously worked under that Windows NT identity. In addition, the application can use the Windows NT user profile facility to derive correspondence between Windows NT users and users of the application. When the application is used on a computer using an operating system such as Windows 98, Windows 95, or Windows 3.1, or any other operating system environment that lacks rigorous access controls, the application can prompt the user for the user identity and password. For example, the application can maintain a listing of users registered for a particular computer, and can invoke the user profile of an individual user so identified. Optionally, an individual user of an application installation can turn off the user identification capabilities, and in that case the user profile of that user can always be invoked without prompting.

The account services module 344 possesses the capability to calculate monetary charges for advertising services provided. It is able to generate invoices, statements of account, and other standard accounting documents for billing advertisers for the services provided. It allows accounts receivable information to be transferred into a standard accounting package. The module 344 capability is constructed to provide considerable flexibility in the tariff calculations used to generate billing. Thus, charges can be calculated from the numbers of banners specified, the numbers of users selected to receive the banners, the time periods for which the banners will be in service, the numbers of times each banner is planned to be exposed, the priority of banner presentation, and other features selected by the advertiser. This tariff model reflects a static, a priori approach, and the bill, in principle, can be determined at the time when the advertiser selects the services, and the advertiser can be accurately informed immediately of the charges accrued, even before a single banner is displayed. In addition, charges can be calculated from the actual numbers of banners displayed, the number of times each banner is displayed, the duration of each display, the priority of banner presentation, and other features actually invoked by users. This tariff model reflects a dynamic, a posteriori approach, and the bill is not determined until after banners have been displayed to users, and the advertiser is provided with an estimate of the charges that might be accrued until after all banners have gone out of service.

The accounting services module 344 capability provides an account manager with capabilities to control the use of services by an advertiser. It allows the activities of an advertiser to be suspended; banners and data belonging to the suspended advertiser can be held until explicitly discarded by the account manager. All of the resources belonging to an advertiser can be discarded or archived by specifying the advertiser. Archived material may be retrievable by specifying the advertiser and date and time of archive. The account manager is able to set a credit limit for an advertiser; banner display activity on behalf of that advertiser and can be suspended when current charges for advertising services exceed the credit limit. The mechanism is able to accommodate both positive and negative credit limits and current account balances; in all cases advertising activity can be suspended if current activity will result in a current account balance that exceeded the credit limit. The server provides an account manager with capabilities for communication with advertisers about their credit status and other subjects. Communications media includes paper letters, electronic mail, document facsimile, and telephone.

A new advertiser can connect to the vendor's advertising URL for registration and authentication. For example, a potential or prospective advertiser can provide information such as company name, contact person, address information, product information, and the like. The advertiser then can be provided with authentication material for reestablishing identification in future sessions. For example, the vendor can provide suitable authentication mechanisms, such as passwords or X.509 certificates. The advertiser can be provided with mechanisms to establish credit status; and the advertiser can make payment to the vendor by credit card, or other means for providing a secure transaction. Mechanisms, such as the use of virtual private network (VPN) technology, preferably are employed in order to ensure that unauthorized personnel do not receive access to the advertiser's site without proper identification and authentication.

In addition, the advertiser services module 344 is able to specify field names and values to specify reporting and control criteria for all of the data reflecting the demographics, computer usage, and banner delivery for users. Furthermore, the software captures data about each presentation of a banner to a user at the product. It captures the user to whom the banner is presented. It captures the time and date that the banner is displayed; it captures the duration of display.

Upon proper initial installation of the client software, an Internet connection to the server shall be attempted. If that attempt is not successful, further installation will be attempted. Once connected, the client software declares itself to the server as a new installation. The server then responds with a unique installation identifier that shall be used for subsequent identification of the client software in all interactions between that software and the server. The client software can provide certain information to the server. For example, the server can be notified as to the version of each component of the client software that has been installed into that computer, details of the hardware environment of the computer (e.g., processor speed, memory size, disk size and free space, and speed of communications connections), and details of the software environment of the computer (e.g., operating system and applications packages). The server can determine whether the client software is out of date, and transfer upgrades of those components to the computer. The client software can ensure that the upgraded components are installed in the correct location in the computer directory. Optionally, the server can determine with certain other software within the computer is out of date or improperly installed. The server can deliver relevant updated software to the computer; and the client software can ensure that the upgraded software is properly installed in the correct location in the computer directory.

Client and user registration can be implemented as a client-server application with matching components of the particular user. Registration allows for identification and maintenance of the specific installation by the computer from which the user is working. Registration also identifies and captures data about the user reflecting information including user identity, computing environment and usage, and user demographic profile. In addition, registration can manage the relationships between installations and users; recognizing that a user may use more than one installation and an installation may support more than one user.

Each time the client software is started, it identifies the user running it as well as the computer. It also will attempt to establish an Internet connection to the server. The registration provides for four scenarios. Those scenarios include new user on a new computer, new user on a registered computer, existing user on a new computer, or existing user on an existing computer.

A new (or previously unknown) user using a previously unregistered computer can register. The server receives data from that user in order to obtain information such as user identity, demographic information, a baseline on the user's computer usage, and the like. The server stores that information as a user profile. Thus, it is possible to register the first new user as a preliminary, principal or owning user of that installation; and subsequent users of that installation can be recorded as guest users of that installation. Whenever subsequent installations of the software are run, the user will attempt to establish an Internet connection to the server. The server can identify the user by validating the user's identification, such as a password, that is provided during the initial connection by that user. The vendor can supply an effective authentication mechanism to ensure the proper identity of the user.

A new (or previously unknown or unregistered) user using an previously registered computer can register. The server receives data from that user in order to obtain information such as user identity, demographic information, a baseline on the user's computer usage, and the like. The server then stores that information as a user profile. Thus, that subsequent user of that installation can be recorded as a guest user of that installation.

A previously registered user using a new (or previously unregistered) computer can register. A user providing information shall be granted access to the server, and the server shall retrieve all of the user profile data from the server. Optionally, the user can provide information to provide an updated profile, which then is stored by the server. Typically, the first user to register on a computer shall be designated as the first user; and subsequent users of that installation can be recorded s guest users of that installation. Such an aspect of the present invention is particularly preferred, because a previous user can access personal information from any computer having network access, such as Internet access. In certain circumstances, the initial user can be a parent of a family, a corporation, or the management of an organization, and as such, the initial user can remove guest users from the system. In the event that a user does not expect to use a particular computer again (e.g., such as a computer located in a courtesy business area at an airport), the user can have the option to register as a temporary user, providing of profile information is optional, and no personal profile is maintained on the server for that user.

A previously registered user using a previously registered computer shall be granted access to the server, and the server shall retrieve all of the user profile data from the server. The manner or method for providing access to such a user is described in detail above.

It will thus be appreciated that the present invention allows for the possibility of communication through a network using a wide variety of computers, irrespective of the location of the user. As such, it is possible for a user to communicate with a user through computer devices such as cellular telephones, walkmans, kiosks, personal digital assistants, refrigerator door screens, airplane set screens, car radios, televisions, video recorders, answering machines, and the like.

Preferably, the client software is designed so that it can remain in continuous operation on any computer for an extended period of time, without interruption or failure. It is also preferably designed so that it requires relatively low use of the memory of a user's computer. When written in a platform-independent language, such as Java™, the client software is highly portable. That is, the software can be operated from different computers; and from different operating systems (e.g., Windows, Solaris, Unix, Linux and MacIntosh). In addition, the client software operates in such a manner that it does not compromise the reliability of other applications or of the computer operating system, and does not compromise a user's ability to use or download information from a network, such as the Internet. The client software is relatively easy to maintain, and effort is required to detect and correct any faults within that software. In addition, the modular style of the software allows for efficient and effective improvements, enhancements and other upgrades to that software without wholesale revision of large segments of code. In the event that changes in either computer hardware or software occur, the client software can notify the server. The server then can record that information in its database.

The present invention provides numerous advantages to advertisers advertising over networks. The advertiser services capabilities of the system allows capture of information provided by an advertiser to control delivery and presentation of banner advertisements to selected system users. For example, users can be selected to receive a particular message based on selection of statistical groups of users (however, it is possible to provide a system such that individual users are not identified, recognized or selected). The selection criteria typically utilizes demographic and computer usage data captured from users of the system. For example, for each banner, an advertiser can specify one or more of the following: statistical criteria that selects groups of users to which the banner will be displayed, how many times the banner is displayed to a group, the maximum frequency that the banner is displayed to each group (e.g., advertisement rotation rate), the dates and times that the banner is in service for display, the priority value assigned to the banner for users in each group, and user reactions to the banner (including connection to a web site from a banner). Thus, advertisers are able to examine, in virtually real time, statistical information derived from demographic information and computer usage data captured from users. In addition, advertisers are able to examine, in virtually real time, the effectiveness of particular banner advertisements, as determined for example, from user demographic information, interaction with web sites, etc. Besides selection of user and banner advertising, out of date advertisements can be discarded. Further, management, control and sequencing of advertisements by the advertiser can be controlled.

The present invention can be used in a variety of applications and for a wide variety of uses. The present invention can be used to download electronic copies of published printed materials (e.g., books, magazines, catalogs, newspapers) from a network or from a non-volatile storage device, and the contents of those books can be stored in an electronic library. Thus, the present invention can be used to electronically distribute published printed materials, and information concerning readership of those materials can be collected. In addition, the electronic copy of the printed materials can be maintained by the client in the user's library. The user library can be used to store software, business presentations, blueprints, plans, movies, musical albums, games, and the like. Thus, a user can store a computer game, and access that game from another computer. For example, a user can store digital images in an electronic library, thereby providing an electronic album. Digital pictures, in the form of electronic images, can be mailed electronically from any location to service providers that print hard proofs; and thus, for example, vacation pictures can be mailed from on vacation site, and potentially received by time user arrives home. Furthermore, advertising materials, such as those advertising materials contained in newspapers, catalogs and magazines, can be used by the client in order to gain immediate access to an advertiser's web site. The present invention can be used in a wide variety of other commercial applications. For example, banking, bill payment, credit card transactions and processing, customer service, wiring of money, bill payment, travel arrangements and reservations can be carried out.

In this regard, the client software application can work in conjunction with suitable server software to provide a virtual pre-paid cash card. This virtual card can be ordered and paid for by the user via a web interface on the server. The card can be represented by a file containing various information, including a card number, card value, and other useful information, including user-specific information (home address, email address, telephone number) as well as demographic information. Once purchased, the card can be sent to the user or placed in his or her user profile. Then, when the user wishes to purchase an item at another web site or via another electronic medium that supports the virtual card, the user can direct that the purchase be made using the virtual card. This can be done by, for example, clicking an icon or hypertext link on the web site where the purchase is being made, with the software at that site then contacting the server containing the user profile to obtain the virtual card and deduct the price from the card.

The software can also be used to manage an electronic business card file that can be accessed, updated and categorized; and as such, access to an electronic Rolodex containing electronic format cards, including electronic business cards, and other identification and address information, can allow the user to access the web site of the person supplying the business card. Thus, the present invention allows users to send and receive business card information straight from and to card files, without opening electronic mail messages (e.g., upon receipt of such type of information by the computer, the user can click "yes" to save such information to a card file, without opening that message). The business card file can be stored on the server in the user library. If the server is accessible over the Internet this arrangement permits world-wide user access to the business card file and the contact information contained therein, thus allowing the user to access this information even if he or she is traveling.

The present invention also provides the user with an efficient and effective way to shop on line; by creating a kind of global electronic shopping cart which can be used to electronically accumulate items for purchase from any of a number of different sellers and distributors. The shopping cart can be implemented as one or more files stored on the server as a part of the user library and the client software application can be configured to manage the information stored in the shopping cart. Then, for example, when a user browsing on the Internet or other network decides that they wish to purchase a product, suitable purchasing information can be added to the shopping cart. This action can be carried out by selection of an appropriate icon or menu command on the software client application's graphical user interface. Optionally, the icon could be located on a web site itself or the menu command could be added to a menu that is accessible using a mouse, such as by activation of the right button on the mouse. The product information, including pricing and the necessary purchasing information can be made available by the web site to the client software application. Also, the URL of the site containing the product information can be stored in the shopping cart to enable the user to easily return to the site at a later time to review product information. For electronic product information available from other sources, such as set-top television box, the user can select items shown in a television program, television advertisement, or other type of visual advertisement, with an associated URL or other information then being added to the shopping cart. The information added to the shopping cart can be broadcasted along with the television program and then saved in the shopping cart when selected by the user. The user can then review the contents of the shopping cart at a later time, adding and removing items from the cart as desired, reviewing the total purchase price and taxes calculated and displayed by the software, and then making a final purchase. The user profile can include credit card, mailing address, and other such information to enable the purchase of products in the shopping cart without the user having to enter the information each time a purchase is made. As will be appreciated, this permits the user to add items to the cart from different sellers or distributors and without having to make a final purchase decision at that time and without having to attend to actually purchasing the items until a later time when the contents of the entire cart can be examined.

As another example, a user hearing information of interest over a radio having the software installed thereon can press a button on that radio, with the radio then recording the appropriate information that is silently broadcasted along with the audio. The software then accesses the user's profile and library via a network and then adds the appropriate information to the electronic shopping cart. As yet another example, a user seeing information of interest in a print advertisement can scan that information into a computer, the scanner can digitally record that information and convert it to searchable text using an optical character recognition program, with the client software application being configured to then locate a URL or other product information from the recognized text, access the user's profile and library via network access, and then add the appropriate information to the electronic shopping cart.

Advertisers can provide information in conjunction with advertisements. For example, advertisers can provide advertising information as well as a ticker containing information regarding sports, business, news, weather, traffic, or the like. The system also is useful for companies, organizations, charitable and non-profit groups, associations, families, and the like. For example, the system can be used by organizations including religious, educational, fraternal, alumni and professional organizations. As such, the present invention can be used as a communication tool by a corporation or organization, and members of the corporation or organization with access to a computer and a network can efficiently and effectively access currently updated information. The system can also be used for communication between organizations and individuals. For example, patient monitoring, check ups, prescriptions, and the like, can be communicated. In addition, advertisers can provide interactive advertisements; providing for electronic commerce and well as focus group type feed back. Furthermore, advertising can be used by non-profit and charitable organizations for fund raising and public awareness purposes. Thus, advertisements can be information provided for a commercial nature, or advertising can be considered information supplied by a group or organization to the user's of that group are members.

It will thus be apparent that there has been provided in accordance with the present invention a method and apparatus for providing an automatically upgradeable graphical user interface with targeted advertising and with information maintenance, organization and communication capabilities which achieve the aims and advantages specified herein. It will of course be understood that the foregoing description is of a preferred exemplary embodiment of the invention and that the invention is not limited to the specific embodiment shown. Various changes and modifications will become apparent to those skilled in the art. For example, although the advertising features described herein have been disclosed in connection with client software application 10, it will be appreciated that these features can be incorporated into any of a number of other types of software applications and can even be incorporated into the operating system's user interface itself. Other features of client software application 10 can be incorporated into and made an integral part of other software applications and operating systems. Also, rather than downloading the client software application via the Internet or some other network, it could be installed on the user's computer from a CDROM or DVD, with the new user login process of FIG. 9 being used to acquire demographic data on all users of the software. All such variations and modifications are intended to come within the scope of the appended claims.

I claim:

1. A method comprising:
   permitting a computer user to access one or more servers via a network;
   transferring a copy of software to a computer associated with the computer user, the software being configured to run on the computer to display advertising content and record computer usage information associated with utilization of the computer, wherein the computer usage information includes data regarding one or more programs run on the computer;
   determining a unique identifier associated with the computer, wherein the
   identifier uniquely identifies information sent from the computer to the one or more servers;
   determining that one or more keywords of a plurality of keywords are associated with a displayed webpage with the plurality of keywords being stored in a memory associated with the one or more servers;
   selecting an advertisement to be displayed on the computer, the selection based at least on the one or more keywords together with information associated with the unique identifier identifying the computer;
   receiving a request for an advertisement from the computer accessing the web page; and
   providing the selected advertisement for display on the computer in response to the received request.

2. The method of claim 1 further comprising using the unique identifier to acquire demographic information about the user.

3. The method of claim 2 wherein the selection of the advertisement is further based on the demographic information.

4. The method of claim 2 wherein the selection of the advertisement is further based on a location of the computer.

5. The method of claim 1 wherein the advertising content is stored on the one or more servers.

6. The method of claim 1 further comprising periodically selecting and transferring additional advertising content to the computer in response to additional usage of the computer by the user.

7. The method of claim 1 wherein the network is a publicly-accessible global computer network.

8. The method of claim 1 wherein the unique identifier identifies the copy of the software from among other copies of the software.

9. The method of claim 1 further comprising downloading, to the computer, a cookie containing a unique identifier.

10. The method of claim 1 wherein the software, when run on the computer, requires a user login to use the software and associates a different unique identifier with each of a number of valid users of the software.

11. The method of claim 1 wherein the software, when run on the computer, requires a user login to use the software and uses the user login to associate one of a number of unique identifiers with the computer usage information recorded by the software.

12. The method of claim 1 wherein the computer usage information includes data regarding information resources accessed by the computer over the network.

13. The method of claim 1 further comprising:
recording usage information;
using said recorded usage information to identify a behavior of the user; and
targeting advertising to the user based upon the identified behavior.

14. The method of claim 1 wherein the user is permitted to anonymous download access to the software and the one or more servers is provided demographically-relatable computer usage information.

15. The method of claim 1 wherein the selected advertisement is displayed within the displayed webpage.

16. The method of claim 15 wherein the selected advertisement is displayed within an advertisement section of the displayed webpage.

17. The method of claim 1, further comprising:
obtaining advertiser registration information;
receiving advertising material associated with the advertiser;
obtaining from the advertiser information used in combination with user demographic data to provide reactive targeting of the advertising material to one or more users via the network;
sending the advertising material via the network for purposes of presentation to the one or more users;
providing information to the advertiser concerning the sent advertising material; and
carrying out a financial transaction with the advertiser related to the sent advertising material.

18. The method of claim 1, wherein the receiving step further comprises receiving from the advertiser criteria used in selecting advertising material to be presented to the users.

19. The method of claim 1, wherein one or more keywords of a plurality of keywords associated with a displayed webpage includes at least one of one or more keywords used in the displayed webpage and one or more keywords in meta tags associated with the displayed webpage.

* * * * *